(12) United States Patent
Hasegawa et al.

(10) Patent No.: US 10,796,569 B2
(45) Date of Patent: Oct. 6, 2020

(54) VEHICLE DETERMINATION APPARATUS, VEHICLE DETERMINATION METHOD, AND COMPUTER READABLE MEDIUM

(71) Applicant: MITSUBISHI ELECTRIC CORPORATION, Tokyo (JP)

(72) Inventors: Takefumi Hasegawa, Tokyo (JP); Masahiro Abukawa, Tokyo (JP); Akira Hirata, Tokyo (JP); Michinori Yoshida, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 60 days.

(21) Appl. No.: 15/780,589

(22) PCT Filed: Jan. 26, 2016

(86) PCT No.: PCT/JP2016/052109
§ 371 (c)(1),
(2) Date: May 31, 2018

(87) PCT Pub. No.: WO2017/130285
PCT Pub. Date: Aug. 3, 2017

(65) Prior Publication Data
US 2019/0005814 A1    Jan. 3, 2019

(51) Int. Cl.
*G08G 1/056* (2006.01)
*G08G 1/017* (2006.01)
(Continued)

(52) U.S. Cl.
CPC ......... *G08G 1/056* (2013.01); *G06K 9/00798* (2013.01); *G06K 9/00805* (2013.01);
(Continued)

(58) Field of Classification Search
CPC ......... G06K 9/00805; G06T 7/70; G08G 1/00
(Continued)

(56) References Cited

U.S. PATENT DOCUMENTS

2005/0228587 A1* 10/2005 Kobayashi ........... G05D 1/0246
                                                          701/300
2008/0240506 A1    10/2008 Nakamura et al.
2017/0267178 A1*  9/2017 Shiga ..................... B60R 11/02

FOREIGN PATENT DOCUMENTS

JP    2005-267120 A    9/2005
JP    2005-339176 A    12/2005
(Continued)

OTHER PUBLICATIONS

International Search Report for PCT/JP2016/052109 (PCT/ISA/210) dated Apr. 26, 2016.
(Continued)

*Primary Examiner* — Kiet M Doan
(74) *Attorney, Agent, or Firm* — Birch, Stewart, Kolasch & Birch, LLP

(57) ABSTRACT

A direction identification unit (21) identifies a traveling direction in which a surrounding vehicle travels in a partial region of a region indicated by image information (42) obtained by photographing using a camera (31). A feature amount acquisition unit (22) acquires a reference feature amount (41) being a feature amount computed from a reference image corresponding to the identified traveling direction. A vehicle determination unit (23) computes an image feature amount being a feature amount of the image information of the partial region and compares the computed image feature amount with the acquired reference feature amount (41), thereby determining whether the surrounding vehicle is present in the partial region.

9 Claims, 37 Drawing Sheets

(51) Int. Cl.
  *G06K 9/00* (2006.01)
  *G06K 9/62* (2006.01)
  *G06K 9/32* (2006.01)
  *G06K 9/46* (2006.01)
  *G06T 7/70* (2017.01)

(52) U.S. Cl.
  CPC ......... *G06K 9/3233* (2013.01); *G06K 9/4628* (2013.01); *G06K 9/6274* (2013.01); *G06T 7/70* (2017.01); *G08G 1/0175* (2013.01); *G06T 2207/30252* (2013.01)

(58) Field of Classification Search
  USPC .......... 382/104, 201, 154, 103; 348/148, 46
  See application file for complete search history.

(56) References Cited

FOREIGN PATENT DOCUMENTS

| | | |
|---|---|---|
| JP | 2007-329762 A | 12/2007 |
| JP | 2008-249480 A | 10/2008 |
| JP | 2010-262665 A | 11/2010 |
| JP | 2011-257984 A | 12/2011 |
| JP | 2013-161202 A | 8/2013 |

OTHER PUBLICATIONS

Li Xiuzhi et al., "Sparse representation method of vehicle recognition in complex traffic scenes", p. 387-392, vol. 17, No. 3, Mar. 2012, Journal of Image and Graphics.
Office Action issued in corresponding Chinese Application No. 201680079635.2 dated Jul. 2, 2020.

* cited by examiner

Fig. 5

| DIRECTION FOR VEHICLE | REAR | FRONT |
|---|---|---|
| REFERENCE FEATURE AMOUNT | REFERENCE FEATURE AMOUNT A | REFERENCE FEATURE AMOUNT B |

Fig.28

| | REAR | FRONT |
|---|---|---|
| SAME LANE | REFERENCE FEATURE AMOUNT A | REFERENCE FEATURE AMOUNT B |
| LEFT-ADJACENT LANE | REFERENCE FEATURE AMOUNT C | REFERENCE FEATURE AMOUNT D |
| RIGHT-ADJACENT LANE | REFERENCE FEATURE AMOUNT E | REFERENCE FEATURE AMOUNT F |
| SECOND RIGHT-ADJACENT LANE | REFERENCE FEATURE AMOUNT G | REFERENCE FEATURE AMOUNT H |

Fig.35

| | REAR | | FRONT | |
|---|---|---|---|---|
| | WITHOUT SHIELDED REGION 47 | WITH SHIELDED REGION 47 | WITHOUT SHIELDED REGION 47 | WITH SHIELDED REGION 47 |
| SAME LANE | REFERENCE FEATURE AMOUNT A1 | REFERENCE FEATURE AMOUNT A2 | REFERENCE FEATURE AMOUNT B1 | REFERENCE FEATURE AMOUNT B2 |
| LEFT-ADJACENT LANE | REFERENCE FEATURE AMOUNT C1 | REFERENCE FEATURE AMOUNT C2 | REFERENCE FEATURE AMOUNT D1 | REFERENCE FEATURE AMOUNT D2 |
| RIGHT-ADJACENT LANE | REFERENCE FEATURE AMOUNT E1 | REFERENCE FEATURE AMOUNT E2 | REFERENCE FEATURE AMOUNT F1 | REFERENCE FEATURE AMOUNT F2 |
| SECOND RIGHT-ADJACENT LANE | REFERENCE FEATURE AMOUNT G1 | REFERENCE FEATURE AMOUNT G2 | REFERENCE FEATURE AMOUNT H1 | REFERENCE FEATURE AMOUNT H2 |

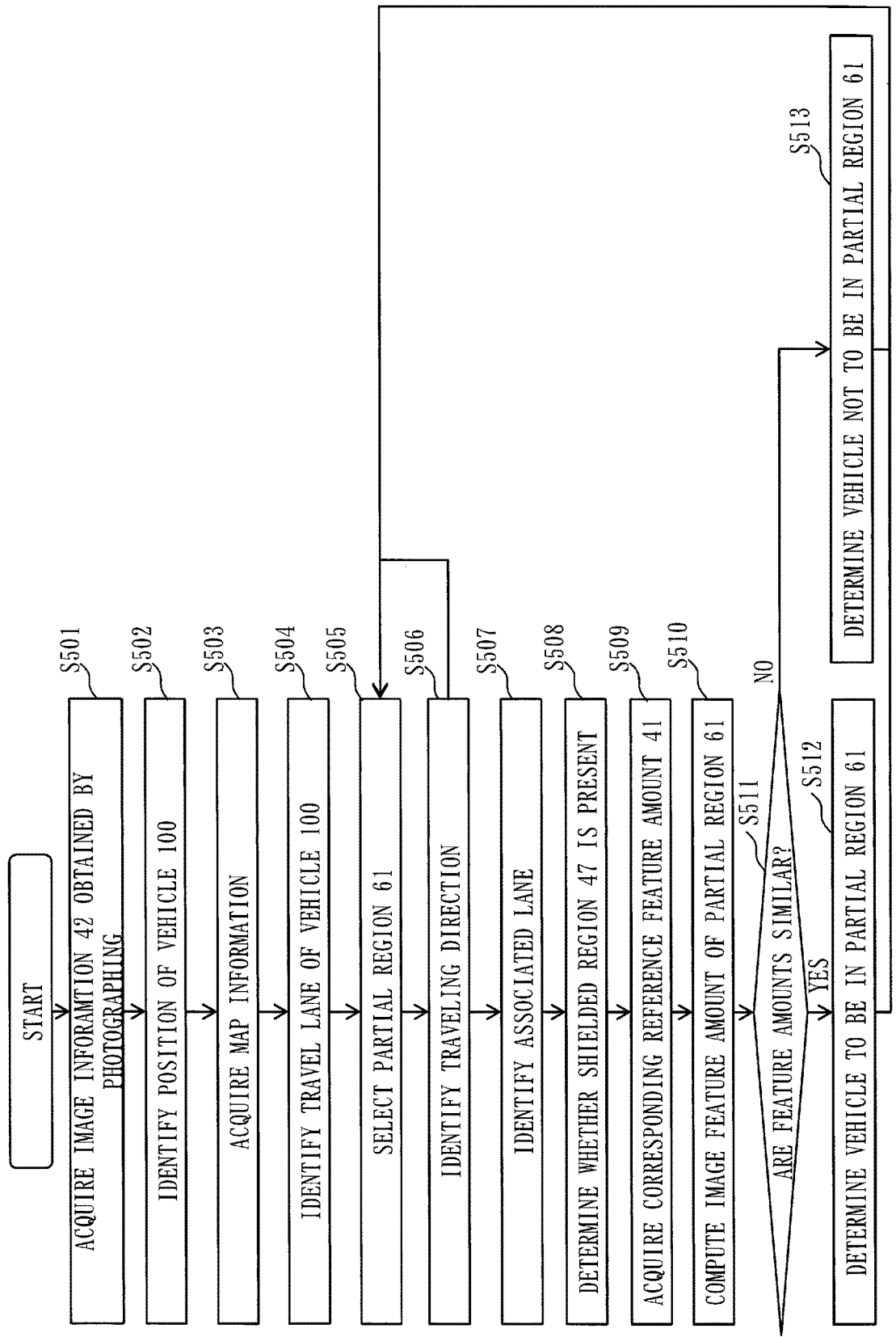

VEHICLE DETERMINATION APPARATUS, VEHICLE DETERMINATION METHOD, AND COMPUTER READABLE MEDIUM

TECHNICAL FIELD

The present invention relates to a technology for identifying a vehicle on a road using information of an image photographed by a camera.

BACKGROUND ART

Advanced driver assistance systems (ADAS) such as automatic braking and ACC (Adaptive Cruise Control) have been marketed in a general market. Research and development of an autonomous driving system have also been under way, and a test of an autonomous vehicle on public roads has been performed.

Among vehicles and autonomous vehicles with the advanced driving assistance systems installed therein, there is a vehicle for which, by using a photographed image obtained by photographing around the vehicle by a vehicle-mounted camera, image recognition of a surrounding vehicle that is present around the vehicle is performed and the surrounding vehicle is detected.

As a method of detecting the surrounding vehicle using an image recognition process, there is a method of storing a large amount of image information of various vehicles as reference images in a database in advance and performing a pattern matching process between the photographed image and the reference images.

As the pattern matching process, there is a method of computing HoG (Histograms of Oriented Gradients) feature amounts using the reference images and the photographed image and determining whether or not the vehicle is photographed in the photographed image by an SVM (Support Vector Machine). As the pattern matching process, there is also a method of detecting, by a CNN (Convolutional Neural Network), a photographed image region similar to a feature amount map indicating a feature of the vehicle.

As the reference images in the database, a correct answer image being image information obtained by photographing the vehicle and an incorrect answer image being image information in which the vehicle is not photographed are employed.

By detecting, by the image recognition process, the image region of the vehicle included in the image information obtained by the photographing, the position of the surrounding vehicle that is present around the vehicle can also be detected. By utilizing a result of this detection, the advanced driver assistance systems such as the automatic braking and the ACC and a process of determining the travel route of an autonomous vehicle can be implemented.

An amount of computation for the image recognition process is large. Therefore, if a low-cost image processing apparatus is used, an image processing speed is reduced, so that application to systems, such as the advanced driver assistance systems and the autonomous driving system, which demand real-time performance, will become difficult.

Further, depending on a traveling environment, there is a case where the surrounding vehicle is not detected even if the surrounding vehicle is photographed in the photographed image, and on the contrary, there is a case where the surrounding vehicle is erroneously detected even if the surrounding vehicle is not photographed. In particular, a direction where the surrounding vehicle is photographed differs according to a relative position between the vehicle-mounted camera of the vehicle and the surrounding vehicle. Therefore, image information of the surrounding vehicle photographed in the photographed image greatly differs, so that a detection rate of the surrounding vehicle in the image recognition process will be reduced.

As mentioned above, the detection accuracy of the surrounding vehicle is reduced due to the traveling environment and the environment of photographing. Thus, the ACC to reduce a burden of the driver at a time of a traffic jam and the automatic braking as an assistance when a driver has made a mistake in driving are commercialized. However, the autonomous vehicle has not been commercialized yet. An image recognition technology with higher detection accuracy of a surrounding vehicle and a less computation amount than ever before is desired in order to enhance safety of an automobile, as well as to market the autonomous vehicle.

Patent Literature 1 describes that a degree of skew, which is a relative angle between a vehicle and a surrounding vehicle, is determined, an image recognition algorithm for the surrounding vehicle is switched according to the magnitude of the degree of the skew, and the surrounding vehicle is detected using a photographed image. Specifically, according to Patent Literature 1, when the degree of the skew is low, the surrounding vehicle is detected by the pattern matching process, and when the degree of the skew is high, the surrounding vehicle is detected by an optical flow process. That is, according to Patent Literature 1, when the degree of the skew between the vehicle and the surrounding vehicle is high, so that a reference image photographed from a front side and the photographed image greatly differ, the surrounding vehicle is detected by the optical flow process without using the reference image.

CITATION LIST

Patent Literature

Patent Literature 1: JP 2013-161202 A

SUMMARY OF INVENTION

Technical Problem

In the optical flow process, identification of the type of the surrounding vehicle and identification between the vehicle and a moving object other than the vehicle become difficult. Therefore, according to the technology described in Patent Literature 1, when the degree of the skew is high, the type and so on of the surrounding vehicle cannot be recognized.

An object of the present invention is to allow detection of a surrounding vehicle at high speed and with high accuracy using information of an image photographed by a camera.

Solution to Problem

A vehicle determination apparatus according to the present invention may include:

a direction identification unit to identify a traveling direction in which a surrounding vehicle travels in a partial region of a region indicated by image information obtained by photographing by a camera;

a feature amount acquisition unit to acquire an image feature amount computed from a reference image corresponding to the traveling direction identified by the direction identification unit; and a vehicle determination unit to compute an image feature amount of the image information of the partial region and compare the computed image feature amount with the image feature amount acquired by the feature amount acquisition unit, thereby determining whether or not the surrounding vehicle is present in the partial region.

Advantageous Effects of Invention

In the present invention, using the reference image corresponding to the traveling direction of the surrounding vehicle in the partial region to be processed, it is determined whether or not the surrounding vehicle is present in the partial region. With this arrangement, the process can be performed at high speed by reducing the number of reference images to be used. Further, since an appropriate reference image is used, the surrounding vehicle can be detected with high accuracy.

BRIEF DESCRIPTION OF DRAWINGS

FIG. 5 is an explanatory table of the reference feature amounts 41 that are stored in a storage 122 according to the first embodiment.

FIG. 28 is an explanatory table of reference feature amounts 41 that are stored in the storage 122 according to the third embodiment.

FIG. 35 is an explanatory table of the reference feature amounts 41 that are stored in the storage 122 according to the fourth embodiment.

FIG. 36 is a flowchart illustrating operations of the vehicle determination apparatus 10 according to the fourth embodiment.

DESCRIPTION OF EMBODIMENTS

First Embodiment

Description of Configuration

Figure 1:
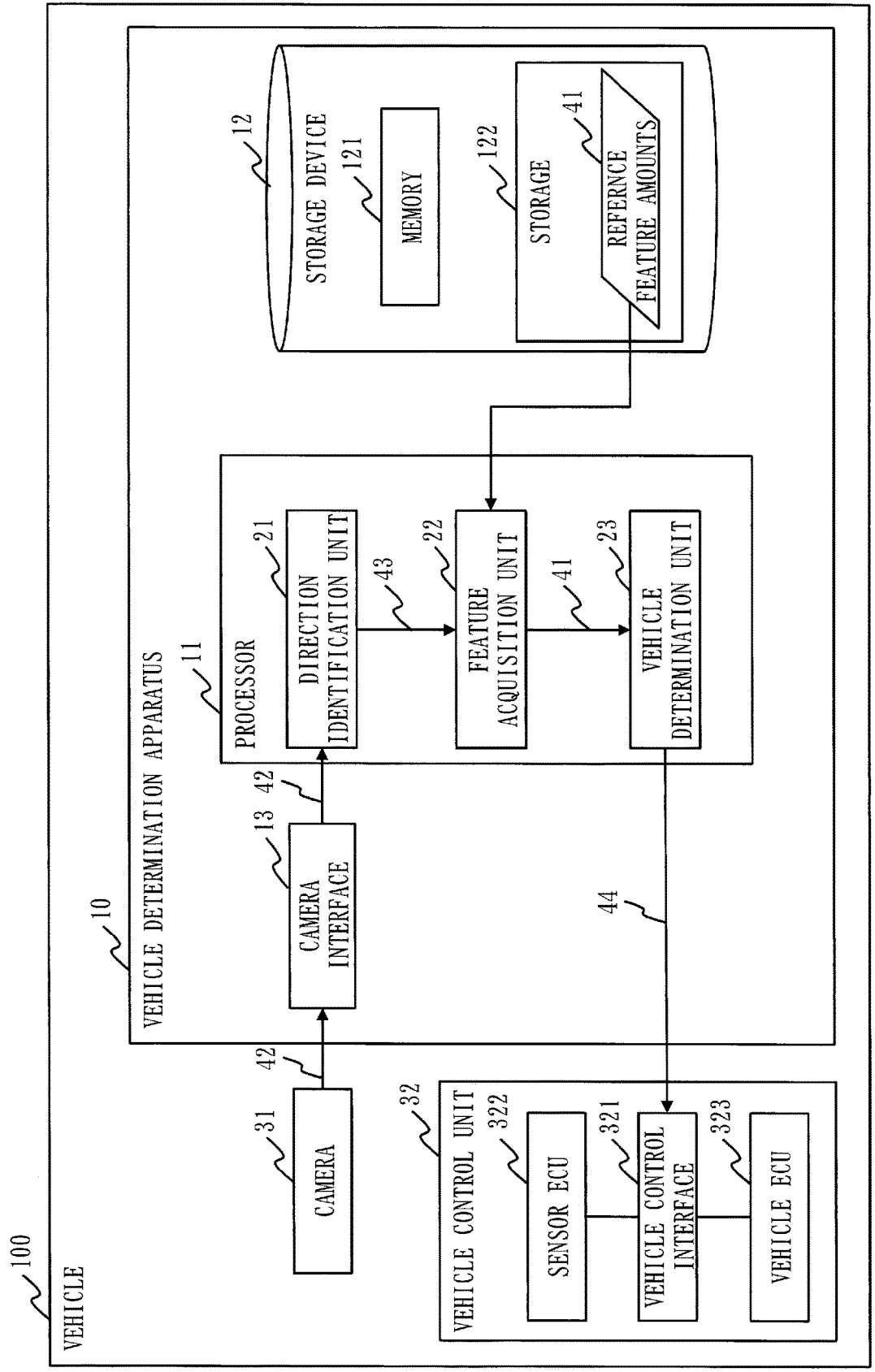
FIG. 1 is a configuration diagram of a vehicle determination apparatus 10 according to a first embodiment.

A configuration of a vehicle determination apparatus 10 according to a first embodiment will be described with reference to FIG. 1.

The vehicle determination apparatus 10 is a computer that is mounted on a vehicle 100. The vehicle determination apparatus 10 is connected to a vehicle control unit 32 mounted on the vehicle 100 via a vehicle control interface 321.

The vehicle determination apparatus 10 includes a processor 11, a storage device 12, and a camera interface 13. The processor 11 is connected to the other hardware via signal lines and controls these other hardware.

The processor 11 is an IC (Integrated Circuit) to perform processing. As a specific example, the processor 11 is a CPU (Central Processing Unit), a DSP (Digital Signal Processor), or a GPU (Graphics Processing Unit).

The storage device 12 includes a memory 121 and a storage 122. As a specific example, the memory 121 is a RAM (Random Access Memory). As a specific example, the storage 122 is a ROM (Read Only Memory). The storage 122 may be an HDD (Hard Disk Drive). Alternatively, the storage 122 may be a portable storage medium such as an SD (Secure Digital) memory card, a CF (Compact Flash), a NAND flash, a flexible disk, an optical disk, a compact disk, a blue ray (registered trade mark) disk, or a DVD.

The camera interface 13 is a device to connect a camera 31 mounted on the vehicle 100 for photographing around the vehicle 100. As a specific example, the camera interface 13 is an interface substrate to connect the camera 31. By changing the camera interface 13 according to an output connector, various types of the camera 31 can be connected to the vehicle determination apparatus 10.

The vehicle determination apparatus 10 includes a direction identification unit 21, a feature acquisition unit 22, and a vehicle determination unit 23, as functional components. A function of each unit of the direction identification unit 21, the feature acquisition unit 22, and the vehicle determination unit 23 is implemented by software.

A program to implement the function of each unit of the vehicle determination apparatus 10 is stored in the storage 122 of the storage device 12. This program is loaded into the memory 121 by the processor 11 and is executed by the processor 11. This implements the function of each unit of the vehicle determination apparatus 10. Reference feature amounts 41 to be used by the feature acquisition unit 22 are stored in the storage 122 of the storage device 12. The reference feature amounts 41 may be the ones stored in an external server.

Information, data, signal values, and variable values indicating results of processes of the functions of the respective units that are implemented by the processor 11 are stored in the memory 121 or a register or a cache memory in the processor 11. In the following description, it is assumed that the information, the data, the signal values, and the variable values indicating the results of the processes of the functions of the respective units that are implemented by the processor 11 are stored in the memory 121.

The program to implement each function to be implemented by the processor 11 has been assumed to be stored in the storage device 12. This program, however, may be stored in a portable storage medium such as a magnetic disk, a flexible disk, an optical disk, a compact disk, a blue ray (registered trademark) disk, or a DVD.

Only one processor 11 has been illustrated in FIG. 1. The processor 11, however, may be plural, and a plurality of the processors 11 may cooperate and execute the program to implement each function.

The vehicle control unit 32 is a computer that is mounted on the vehicle 100.

The vehicle control unit 32 includes the vehicle control interface 321, a sensor ECU (Electric Control Unit) 322, and a vehicle ECU 323.

The vehicle control interface 321 is an interface for being connected to a different apparatus such as the vehicle determination apparatus 10.

The sensor ECU 322 is a device to which various sensors such as a speed sensor, an acceleration sensor, a gyro sensor, a laser sensor, and a milliwave sensor are connected and which obtains information from the various sensors.

The vehicle ECU 323 is connected to various control devices for controlling the vehicle 100, such as a brake, an accelerator, and a steering wheel of the vehicle 100. The vehicle ECU 323 controls the various control devices based on the information acquired from the various sensors by the sensor ECU 322 and information transmitted from an external apparatus connected via the vehicle control interface 321, thereby controlling operations of the vehicle 100.

Description of Operations

The operations of the vehicle determination apparatus 10 according to the first embodiment will be described with reference to FIGS. 2 to 10.

The operations of the vehicle determination apparatus 10 according to the first embodiment correspond to a vehicle determination method according to the first embodiment. The operations of the vehicle determination apparatus 10 according to the first embodiment correspond to a vehicle determination program procedure according to the first embodiment.

In the following description, the description will be given, using a case of driving on the left side of a road, as an example. A case of driving on the right side of the road may be considered to be the one in which the right side and the left side are reversed.

Figure 2:
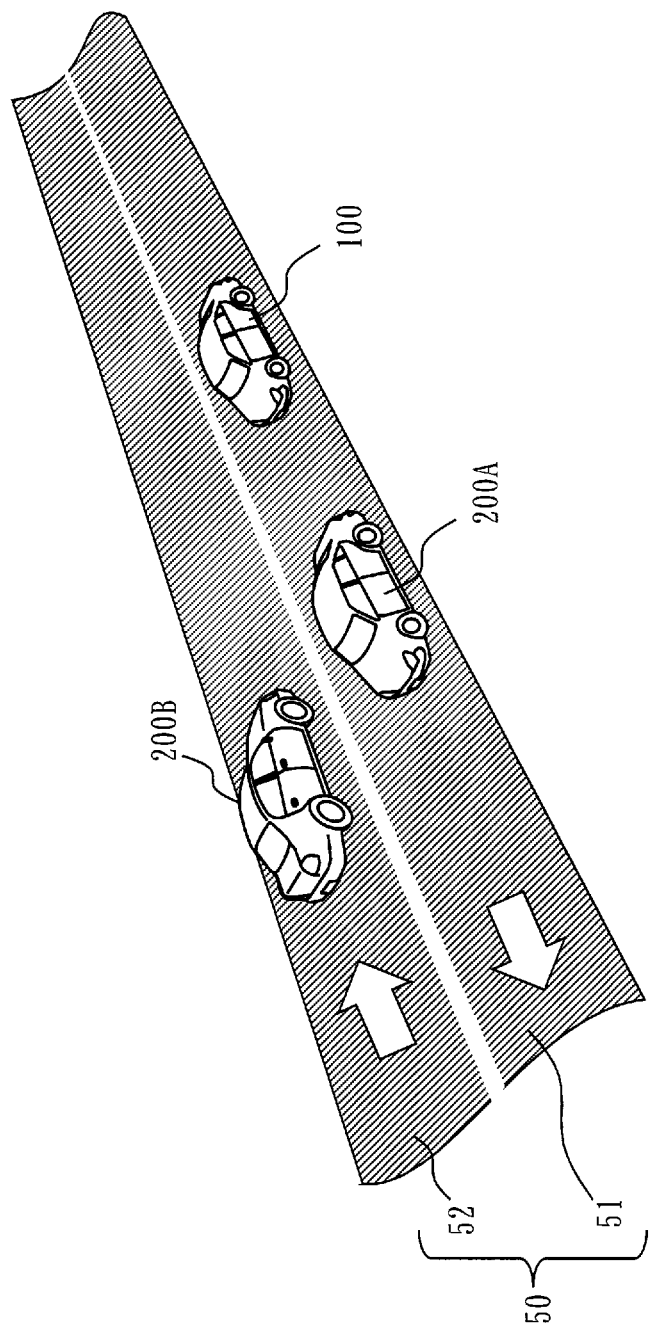
FIG. 2 is a diagram illustrating traveling states of surrounding vehicles 200 according to the first embodiment.
Figure 3:
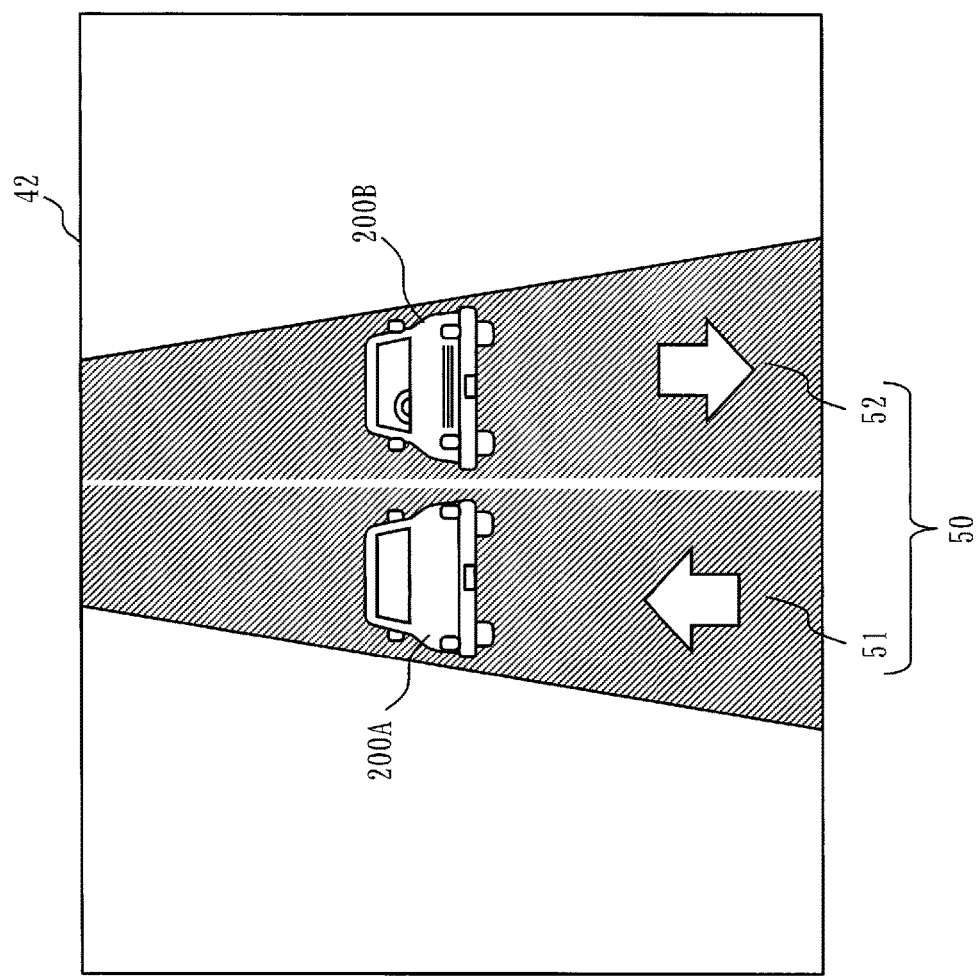
FIG. 3 is a diagram illustrating image information 42 that is obtained in a situation illustrated in FIG. 2 according to the first embodiment.

The operations of the vehicle determination apparatus 10 according to the first embodiment will be outlined with reference to FIGS. 2 and 3.

Referring to FIG. 2, as surrounding vehicles 200 that travel around the vehicle 100 on a road 50, a surrounding vehicle 200A and a surrounding vehicle 200B are present. The surrounding vehicle 200A travels in a parallel lane 51 of a traveling direction which is the same as that of a lane in which the vehicle 100 travels. The surrounding vehicle 200B travels on an opposite lane 52 of a traveling direction opposite to that of the lane in which the vehicle 100 travels. When the front of the vehicle 100 is photographed by the camera 31 mounted on the vehicle 100 in a situation illustrated in FIG. 2, image information 42 as illustrated in FIG. 3 is obtained. That is, the image information 42 in which the surrounding vehicle 200A that travels in the parallel lane 51 has been photographed from the rear and the surrounding vehicle 200B that travels in the opposite lane 52 has been photographed from the front is obtained.

An image greatly differs between when each surrounding vehicle 200 has been photographed from the front and when the surrounding vehicle 200 has been photographed from the rear. That is, the image of the surrounding vehicle 200 to be obtained when photographed by the camera 31 differs according to the traveling direction of the surrounding vehicle 200. When the image differs, a feature amount to be computed from that image also differs.

Then, the vehicle determination apparatus 10 stores the reference feature amount 41 for each photographing direction in which each surrounding vehicle 200 is photographed. Then, with respect to each partial region 61 of a region indicated by the image information 42, the vehicle determination apparatus 10 identifies the traveling direction of the surrounding vehicle 200 in the partial region 61 to be processed and determines whether or not the surrounding vehicle 200 is present in the partial region 61 to be processed, using the reference feature amount 41 corresponding to the identified traveling direction.

Figure 4:
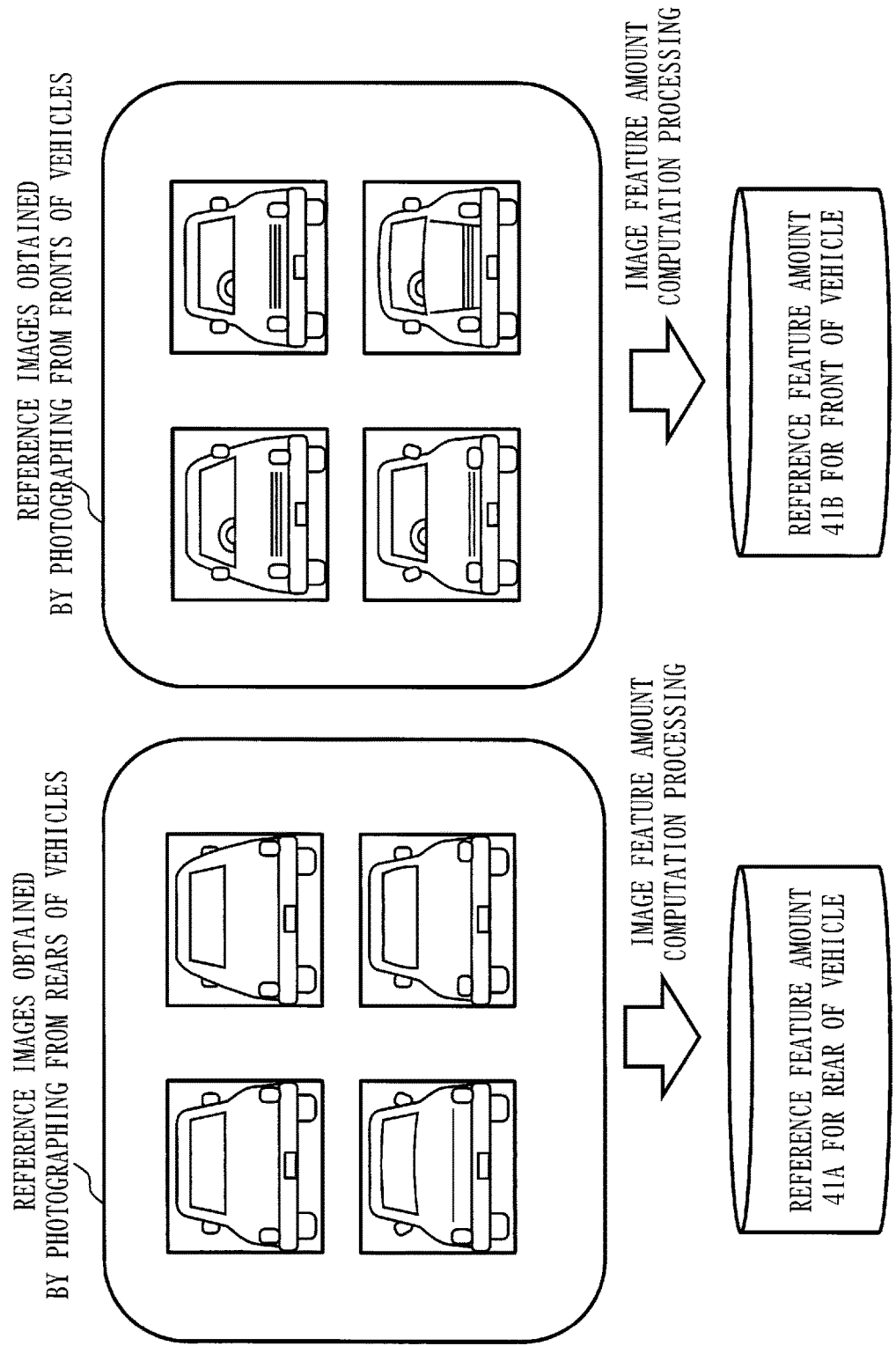
FIG. 4 includes explanatory diagrams of reference feature amounts 41 according to the first embodiment.

The reference feature amount 41 according to the first embodiment will be described with reference to FIGS. 4 and 5.

The reference feature amount 41 is computed by using reference images corresponding to a target photographing direction. Referring to FIG. 4, a reference feature amount 41A for the rear of a vehicle is computed using the reference images obtained by photographing from rears of the vehicles, and a reference feature amount 41B for the front of a vehicle is computed by using the reference images obtained by photographing from fronts of the vehicles. Naturally, the reference images obtained by the photographing from the rears of the vehicles constitute image information of rear portions of the vehicles, while the reference images obtained by the photographing from the fronts of the vehicles constitute image information of front portions of the vehicles. By computing the feature amount using the reference images classified according to the photographing direction, the reference feature amount 41A specialized in the image of a vehicle rear portion and the reference feature amount 41B specialized in the image of a vehicle front portion are computed.

The reference feature amount 41 corresponding to each photographing direction is stored in the storage 122, being associated with each photographing direction as illustrated in FIG. 5.

Herein, the reference feature amount 41A specialized in the image of the vehicle rear portion and the reference feature amount 41B specialized in the image of the vehicle front portion have been computed.

When the reference feature amount 41A is computed, an image on a left oblique rear portion of each of the vehicles, an image on a right oblique rear portion of the vehicle, an image on a left side portion of the vehicle, or an image on a right side portion of the vehicle as well as an image just behind the vehicle may be included. When the reference feature amount 41B is computed, an image on a right oblique front portion of the vehicle or an image on the right side portion of the vehicle as well as an image in front of the vehicle may be included. Herein, the driving on the left side of the road is assumed. Thus, the opposite lane is located on the right side of the vehicle 100. Therefore, when the reference feature amount 41B is computed, no images on the left sides of the vehicles are used.

The operations of the vehicle determination apparatus 10 according to the first embodiment will be described in detail, with reference to FIG. 6.

Figure 6:
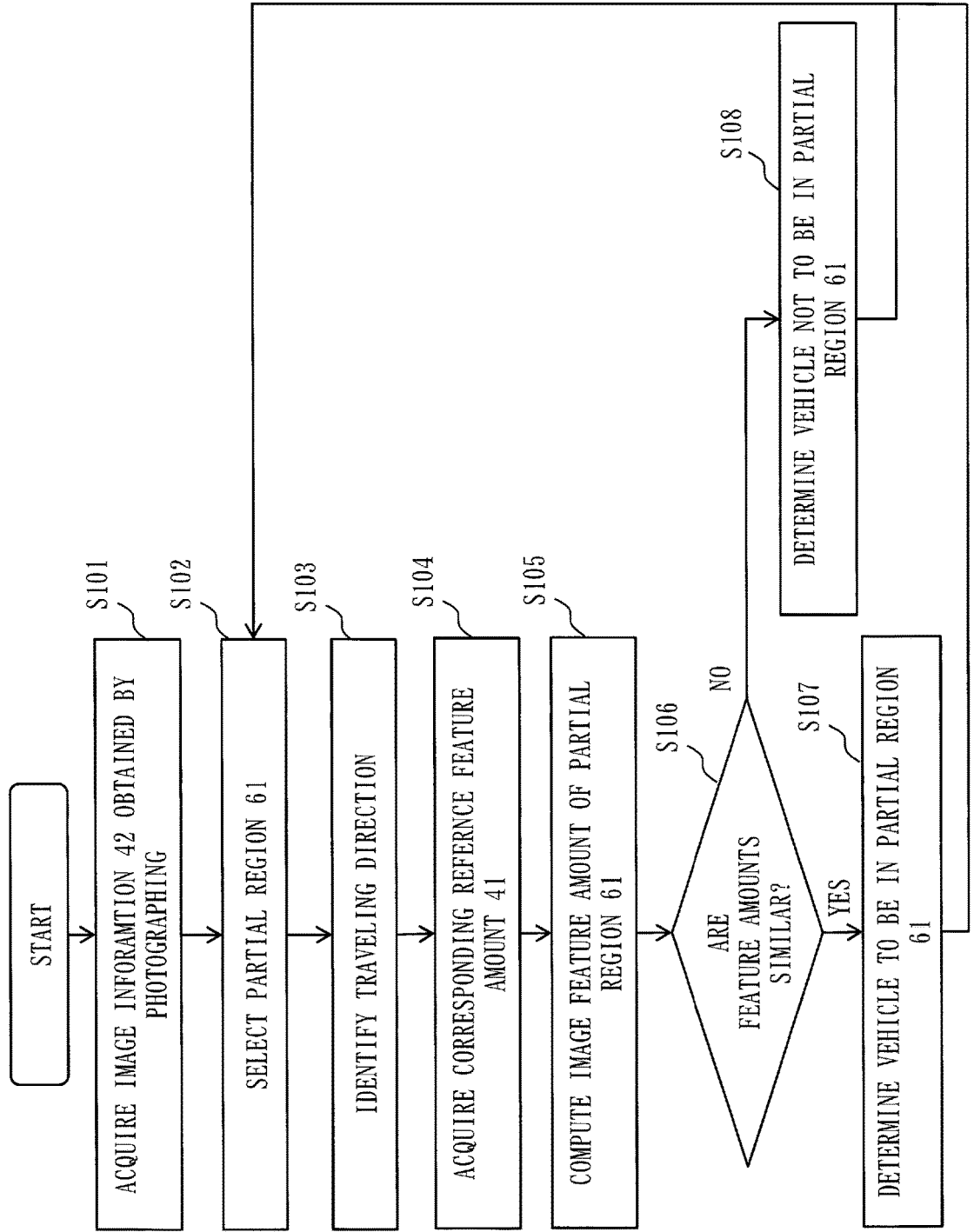
FIG. 6 is a flowchart illustrating operations of the vehicle determination apparatus 10 according to the first embodiment.

In the first embodiment, processes illustrated in FIG. 6 are repetitively executed for each certain period of time. The processes illustrated in FIG. 6 may be executed according to occurrence of an event.

In a photographed image acquisition process in step S101, the direction identification unit 21 acquires, via the camera interface 13, image information 42 in which the front of a vehicle 100 has been photographed by a camera 31. The direction identification unit 21 writes, into the memory 121, the image information 42 that has been acquired.

In a region selection process in step S102, the direction identification unit 21 selects a partial region 61 of a region indicated by the image information 42 acquired in step S101.

A specific description will be given with reference to FIG. 7. The direction identification unit 21 reads the image information 42 from the memory 121, and sequentially selects each partial region 61 of an arbitrary size from the upper left to the lower right of the image information 42 that has been read. In the first embodiment, the direction identification unit 21 sets a square region constituted from horizontal 30 pixels×vertical 30 pixels as each partial region 61, and sets horizontal 5 pixels×vertical 5 pixels as one cell 62. Then, the direction identification unit 21 sequentially selects each of the partial regions 61 respectively shifted by one cell, from the upper left to the lower right of the image information 42. When the image resolution of the reference feature amount 41 is horizontal 1980×vertical 1200, for example, since each of the partial regions 61 respectively shifted by five pixels is extracted, 391 (=(1980−30)/5+1)× 235 (=(1200−30)/5+1) partial regions 61 are each sequentially selected. The direction identification unit 21 writes the selected partial regions 61 into the memory 121.

In a direction identification process in step S103, the direction identification unit 21 identifies a traveling direction in which a surrounding vehicle 200 travels in the partial region 61 selected in step S102.

Specifically, the direction identification unit 21 reads one of the partial regions 61 from the memory 121 and determines whether the partial region 61 that has been read is a region of a parallel lane 51 or a region of an opposite lane 52. Then, if the partial region 61 is the region of the parallel lane 51, the direction identification unit 21 identifies that the traveling direction of the surrounding vehicle 200 is the same direction as that of the vehicle 100. If the partial region 61 is the region of the opposite lane 52, the direction identification unit 21 identifies that the traveling direction of the surrounding vehicle 200 is the opposite direction to that of the vehicle 100. The direction identification unit 21 writes direction information 43 indicating the identified traveling direction into the memory 121.

A method of identifying whether the partial region 61 is the region of the parallel lane 51 or the region of the opposite lane 52 will be described with reference to FIG. 8.

In the case of driving on the left side of the road, the parallel lane 51 is on the left side of the image information 42, and the opposite lane 52 is on the right side of the image information 42 in the camera 31 for photographing the front of the vehicle 100. Then, the direction identification unit 21 sets, as the parallel lane 51, a region from the left end to the center position or a position on a slightly right side of the center position the image information 42, and sets, as the opposite lane 52, a region from the right end to the center position or a position on a slightly left side of the center position of the image information 42.

Figure 8:
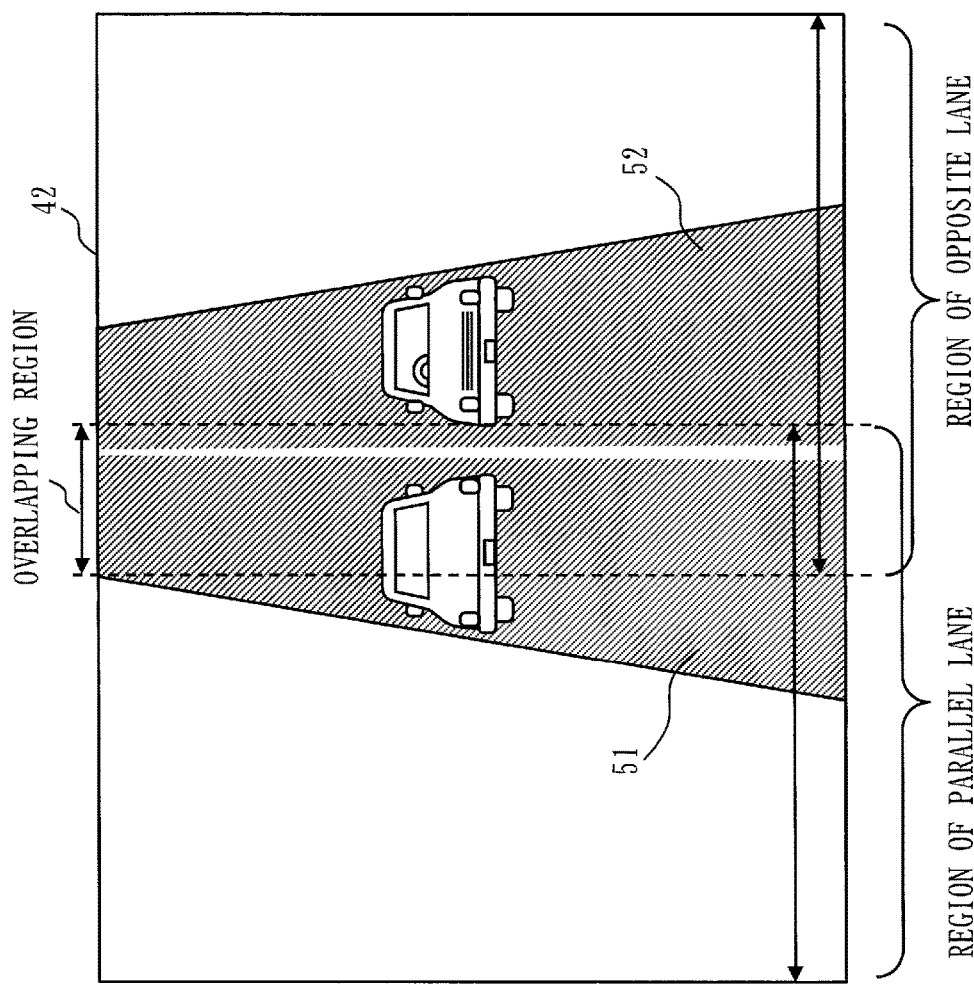
FIG. 8 is an explanation diagram of a region determination method with respect to the partial region 61 according to the first embodiment.

Referring to FIG. 8, the direction identification unit 21 sets, as the parallel lane 51, a region from the left end to the position on the slightly right side of the center position of the image information 42, and sets, as the opposite lane 52, a region from the right end to the position on the slightly left side of the center position of the image information 42. Therefore, there is an overlapping region included in both of the parallel lane 51 and the opposite lane 52, in a central portion of the image information 42 in FIG. 8. The overlapping region is provided as mentioned above because positions of the regions of the parallel lane 51 and the opposite lane 52 in the image information 42 may change according to the traveling position of the vehicle 100.

The direction identification unit 21 determines whether the partial region 61 is the region of the parallel lane 51 or the region of the opposite lane 52 according to which of the region of the parallel lane 51 and the region of the opposite lane 52 the partial region 61 includes. If the partial region 61 includes both of the region of the parallel lane 51 and the region of the opposite lane 52, the direction identification unit 21 determines that the partial region 61 is both of the regions of the parallel lane 51 and the opposite lane 52.

That is, in the method described with reference to FIG. 8, the direction identification unit 21 identifies the traveling direction according to the position of each partial region 61 in the region indicated by the image information 42.

Figure 9:
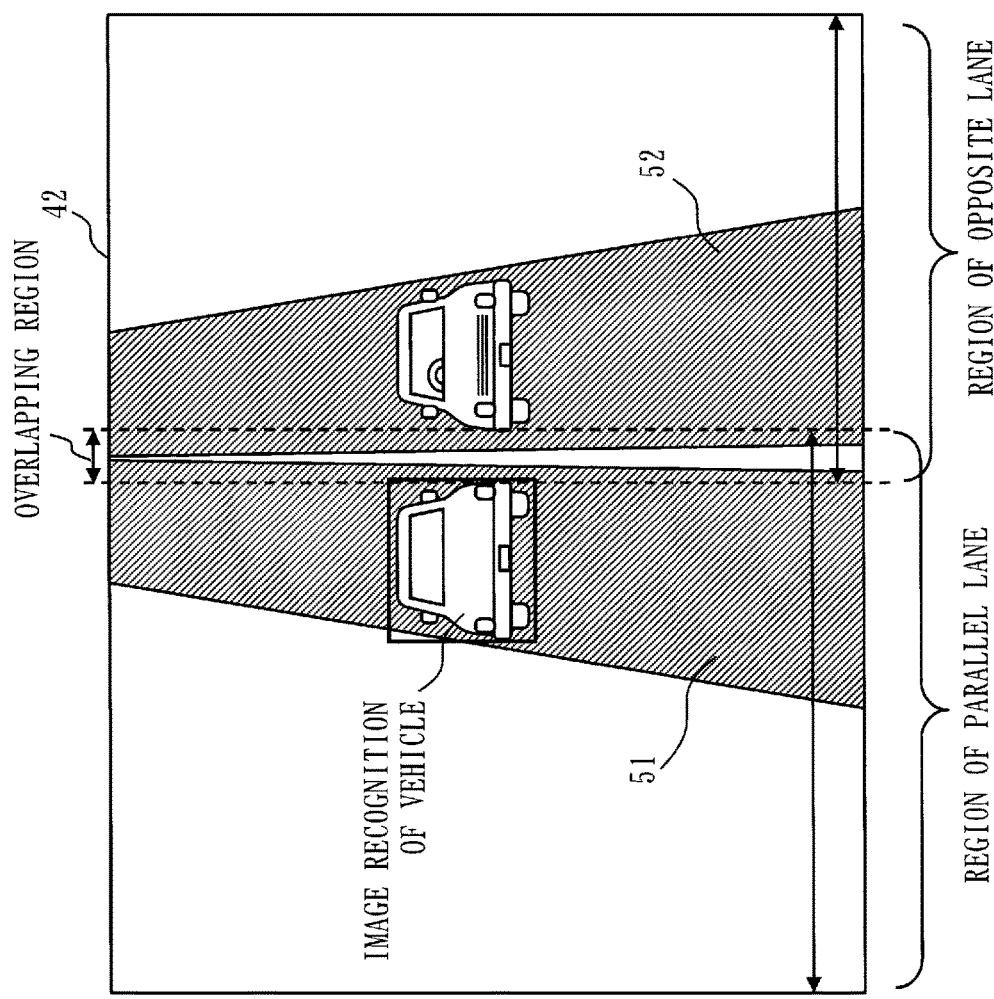
FIG. 9 is an explanatory diagram of a method of narrowing an overlapped region according to the first embodiment.

A method of narrowing the overlapping region will be described with reference to FIG. 9.

It is assumed that a surrounding vehicle 200 that travels in the parallel lane 51 was detected by the vehicle determination unit 23 in the process that will be described later. In this case, a region where the surrounding vehicle 200 was detected is presumed to be in the parallel lane 51 rather than in the opposite lane 52. Then, when the surrounding vehicle 200 that travels in the parallel lane 51 was detected, the direction identification unit 21 sets, as the opposite lane 52, a region from the right end of image information 42 to the right end of the region where the surrounding vehicle 200 was detected. This reduces the region of the opposite lane 52 and narrows the overlapping region.

Similarly, when a surrounding vehicle 200 that travels in the opposite lane 52 was detected, the direction identification unit 21 sets, as the parallel lane 51, a region from the left end of image information 42 to the left end of a region where the surrounding vehicle 200 was detected. This reduces the region of the parallel lane 51 and narrows the overlapping region.

That is, in the method described with reference to FIG. 9, the direction identification unit 21 identifies the traveling direction according to the position of the partial region 61 of the region indicated by the image information 42 and the position of a partial region 61 in which presence of the surrounding vehicle 200 was determined by the vehicle determination unit 23 in the past.

In a feature amount acquisition process in step S104, the feature acquisition unit 22 acquires a reference feature amount 41 corresponding to the traveling direction of the surrounding vehicle 200 identified in step S103.

Specifically, if the traveling direction of the surrounding vehicle 200 has been identified to be the same direction as that of the vehicle 100, the feature acquisition unit 22 acquires the reference feature amount 41 corresponding to the same direction as that of the vehicle 100. That is, the feature acquisition unit 22 reads the reference feature amount 41A for the vehicle rear portion from the storage 122. On the other hand, if the traveling direction of the surrounding vehicle 200 has been identified to be the opposite direction to that of the vehicle 100, the feature acquisition unit 22 acquires the reference feature amount 41 corresponding to the opposite direction to that of the vehicle 100. That is, the feature acquisition unit 22 reads the reference feature amount 41B for the vehicle front portion from the storage 122. Then, the feature acquisition unit 22 writes, into the memory 121, the reference feature amount 41 that has been read.

In a feature amount computation process in step S105, the vehicle determination unit 23 computes an image feature amount that is a feature amount of the partial region 61 selected in step S102.

Specifically, in the first embodiment, the vehicle determination unit 23 computes an HOG feature amount of the partial region 61, as the image feature amount. First, the vehicle determination unit 23 computes the luminance gradient intensity and the luminance gradient direction of each cell 62 constituting the partial region 61. Then, the vehicle determination unit 23 divides the computed luminance gradient direction into nine directions and generates a histogram of the luminance gradient intensity for each direction. Finally, the vehicle determination unit 23 sets all histograms of the respective cells 62, as the image feature amount of the partial region 61. The vehicle determination unit 23 writes, into the memory 121, the image feature amount computed.

Herein, the image feature amount of the partial region 61 becomes the image feature amount of a total of 324 (=9×36) dimensions because each cell 62 has the luminance gradient intensities of nine directions and the number of the cells 62 constituting each partial region 61 is 36.

The reference feature amount 41 stored in the storage 122 has been computed similarly to the image feature amount, using the reference images classified according to the vehicle direction. The reference feature amount 41 computed in advance may be stored, or may be arranged to be updated based on the image information 42.

Herein, the HOG feature amount has been computed as each of the image feature amount and the reference feature amount 41. However, a different feature amount may be computed as each of the image feature amount and the reference feature amount 41.

In a vehicle determination process in step S106, the vehicle determination unit 23 compares the reference feature amount 41 acquired in step S104 with the image feature amount computed in step S105 and determines whether the image feature amount and the reference feature amount 41 are similar.

Specifically, the vehicle determination unit 23 reads the reference feature amount 41 from the storage 122 in step S104 and reads, from the memory 121, the image feature amount computed in step S105. In the first embodiment, the vehicle determination unit 23 compares the image feature amount that has been read with the reference feature amount 41 that has been read, using an SVM, and a similarity degree is computed. Then, the vehicle determination unit 23 determines whether or not the similarity degree is higher than a threshold value.

If the image feature amount and the reference feature amount have been determined to be similar, the vehicle determination unit 23 causes the procedure to proceed to step S107. On the other hand, if the image feature amount and the reference feature amount have been determined not to be similar, the vehicle determination unit 23 causes the procedure to proceed to step S108.

Herein, the SVM has been employed for determining the similarity of the feature amounts. A different method, however, may be employed for determining the similarity of the feature amounts.

Figure 10:
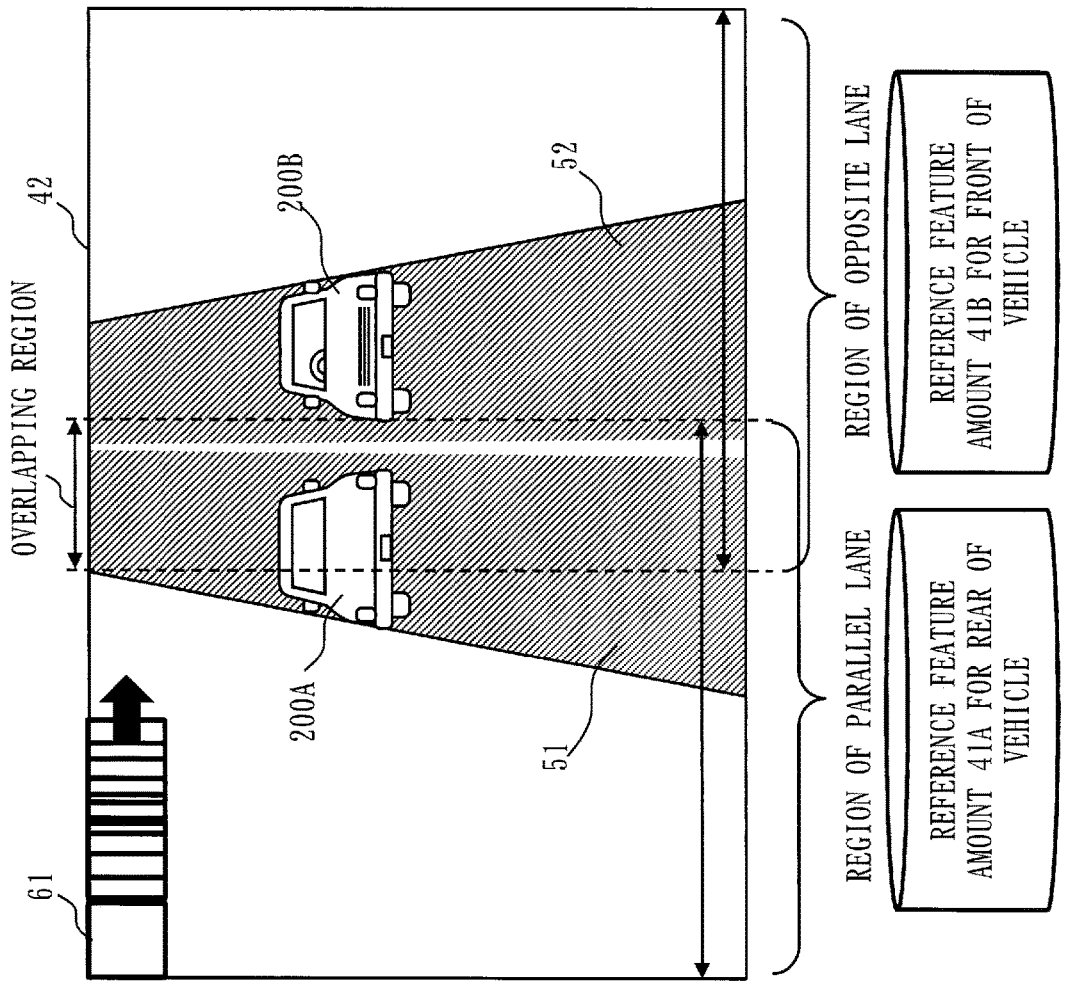
FIG. 10 is an explanatory diagram with respect to similarity determination of a feature amount according to the first embodiment.

That is, as illustrated in FIG. 10, if the partial region 61 is the image region of the parallel lane 51, the determination is made using the reference feature amount 41A for the vehicle rear portion. If the partial region 61 is the image region of the opposite lane 52, the determination is made using the reference feature amount 41B for the vehicle front portion. If the partial region 61 is the overlapping region, the determination is made, using both of the reference feature amount 41A for the vehicle rear portion and the reference feature amount 41B for the vehicle front portion.

In a vehicle determination process in step S107, the vehicle determination unit 23 determines that the surrounding vehicle 200 is photographed in the partial region 61 selected in step S102. That is, the vehicle determination unit 23 determines that the surrounding vehicle 200 is present in the partial region 61. Then, the vehicle determination unit 23 identifies the position of the surrounding vehicle 200 based on the position of the partial region 61 in the image information 42.

The vehicle determination unit 23 transmits identifying information 44 indicating the identified position of the surrounding vehicle 200 to the vehicle control unit 32. Then, the vehicle determination unit 23 returns the procedure to step S102.

The vehicle control unit 32 controls traveling of the vehicle 100, using the identifying information 44 that has been transmitted. If the surrounding vehicle 200 has been detected near the traveling direction of the vehicle 100, for example, the vehicle control unit 32 performs brake control of the vehicle 100, thereby avoiding collision with the surrounding vehicle 200.

In a non-vehicle determination process in step S108, the vehicle determination unit 23 determines that no vehicle is photographed in the partial region 61 selected in step S102. That is, the vehicle determination unit 23 determines that no surrounding vehicle 200 is present in the partial region 61. Then, the vehicle determination unit 23 returns the procedure to step S102.

If the direction identification unit 21 has selected all the regions indicated by the image information 42 as the partial regions 61 in step S102, the procedure is finished.

Effect of First Embodiment

As mentioned above, the vehicle determination apparatus 10 according to the first embodiment determines whether or not the surrounding vehicle 200 is photographed in the partial region 61, using the reference feature amount 41 corresponding to the traveling direction of the surrounding vehicle 200 in the partial region 61. This can detect the surrounding vehicle 200 from the image information 42 at high speed and with high accuracy.

Alternative Configurations

First Variation Example

In the first embodiment, the function of each unit of the vehicle determination apparatus 10 has been implemented by the software. As a first variation example, however, the function of each unit of the vehicle determination apparatus 10 may be implemented by hardware. A difference of this first variation example from the first embodiment will be described.

Figure 11:
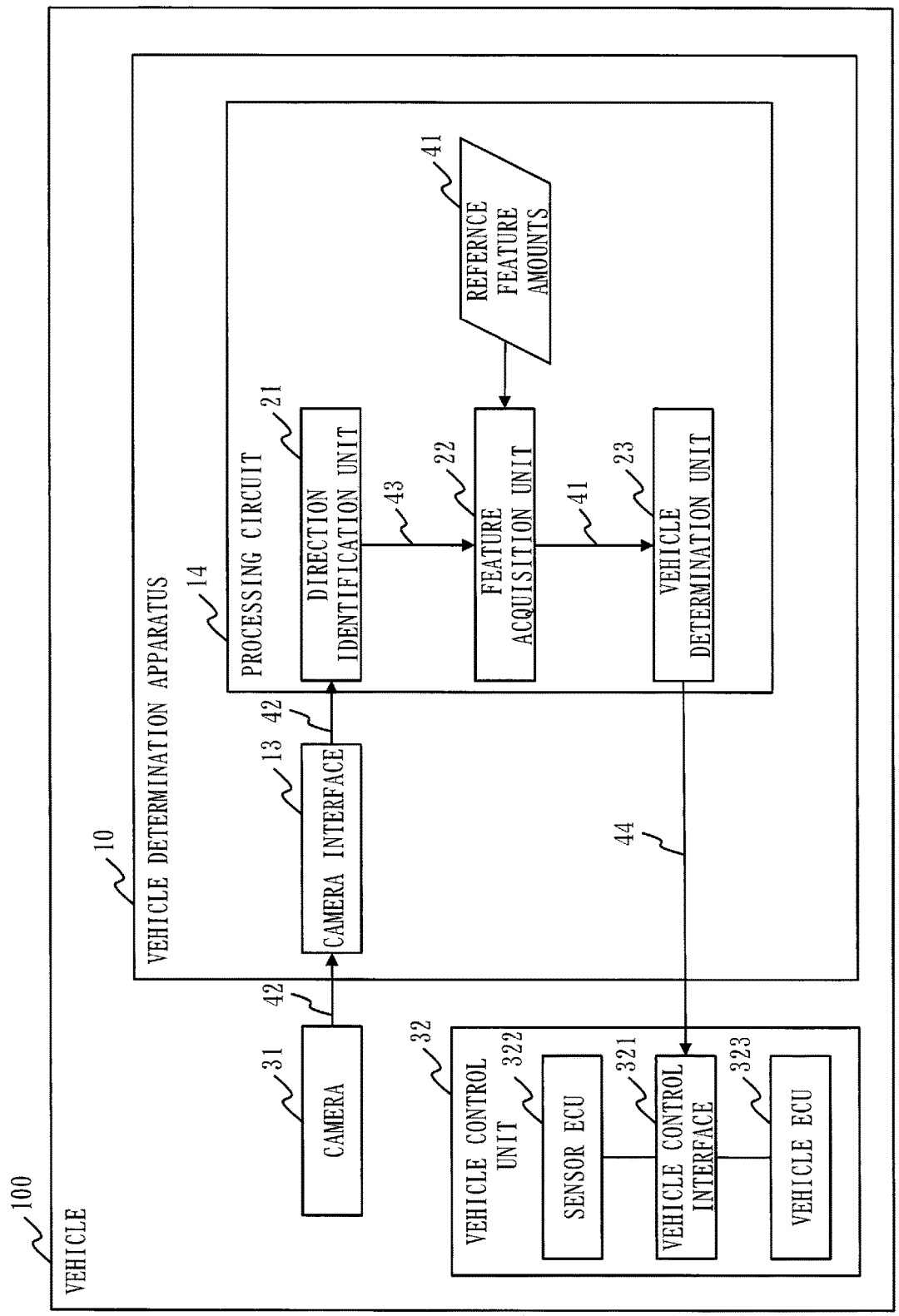
FIG. 11 is a configuration diagram of a vehicle determination apparatus 10 according to a first variation example.

A configuration of a vehicle determination apparatus 10 according to the first variation example will be described with reference to FIG. 11.

When the function of each unit is implemented by the hardware, the vehicle determination apparatus 10 includes a processing circuit 14 in place of the processor 11 and the storage device 12. The processing circuit 14 is an electronic circuit dedicated to implementing the function of each unit in the vehicle determination apparatus 10 and a function of the storage device 12.

The processing circuit 14 is assumed to be a single circuit, a composite circuit, a programmed processor, a parallel-programmed processor, a logic IC, a GA (Gate Array), an ASIC (Application Specific Integrated Circuit), or an FPGA (Field-Programmable Gate Array).

The function of each unit may be implemented by one processing circuit 14, or the function of each unit may be distributed into a plurality of the processing circuits 14, for implementation.

Second Variation Example

A part of the functions may be implemented by hardware, and the other functions may be implemented by software, as a second variation example. That is, the part of the functions of the respective units in the vehicle determination apparatus 10 may be implemented by the hardware and the other functions may be implemented by the software.

The processor 11, the storage device 12, and the processing circuit 14 are collectively referred to as "processing circuitry". That is, the functions of the respective units are implemented by the processing circuitry.

Second Embodiment

A second embodiment is different from the first embodiment in that a region of a parallel lane 51 and a region of an opposite lane 52 are identified when there are a plurality of lanes on each side of a road. In the second embodiment, this difference will be described.

In the second embodiment, a description will be given about a case where there are two lanes on each side of the road. Even a case where there are three or more lanes on each side of the road, however, can be handled, based on a similar concept.

Description of Configuration

A configuration of a vehicle determination apparatus 10 according to the second embodiment will be described with reference to FIG. 12.

The vehicle determination apparatus 10 includes, in addition to the hardware configuration of the vehicle determination apparatus 10 illustrated in FIG. 1, a communication interface 15 and a positioning sensor 16.

The communication interface 15 is a device including a receiver to receive data and a transmitter to transmit data. As a specific example, the communication interface 15 is a communication chip or a NIC (Network Interface Card).

The positioning sensor 16 is a device to receive a positioning signal that has been transmitted by a positioning satellite such as a GPS satellite and can identify the position of a vehicle 100. A quasi-zenith satellite to take an orbit where the quasi-zenith satellite stays in the sky over a specific region for a long period of time may be used as the positioning satellite. Use of the quasi-zenith satellite allows high-precision position information to be computed.

The vehicle determination apparatus 10 includes, in addition to the functional components of the vehicle determination apparatus 10 illustrated in FIG. 1, a lane identification unit 24. A function of the lane identification unit 24 is implemented by software, like the other functions.

Description of Operations

Operations of the vehicle determination apparatus 10 according to the second embodiment will be described with reference to FIGS. 13 to 20.

The operations of the vehicle determination apparatus 10 according to the second embodiment correspond to a vehicle determination method according to the second embodiment. The operations of the vehicle determination apparatus 10 according to the second embodiment correspond to a vehicle determination program procedure according to the second embodiment.

The operations of the vehicle determination apparatus 10 according to the second embodiment will be outlined with reference to FIGS. 13 to 16.

Figure 13:
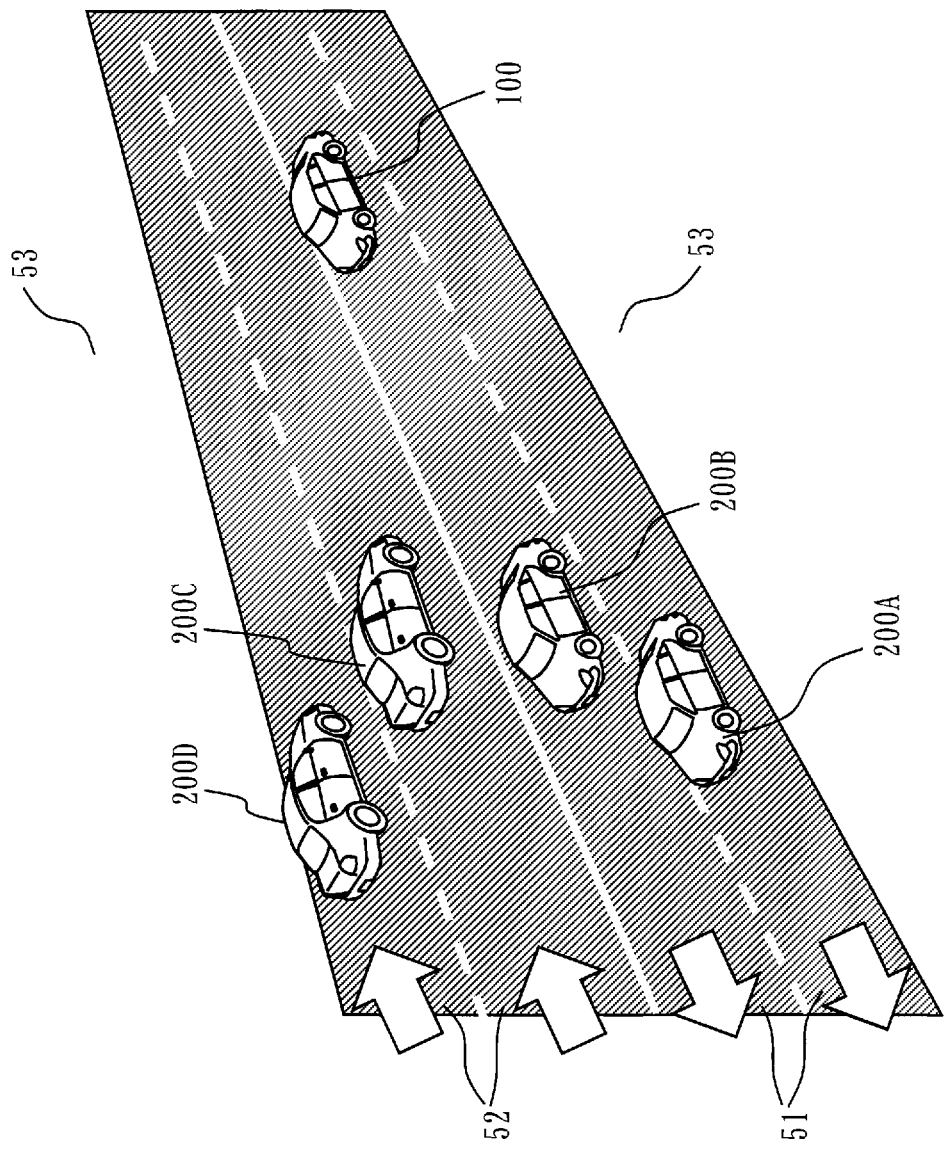
FIG. 13 is a diagram illustrating traveling states of surrounding vehicles 200 according to the second embodiment.
Figure 14:
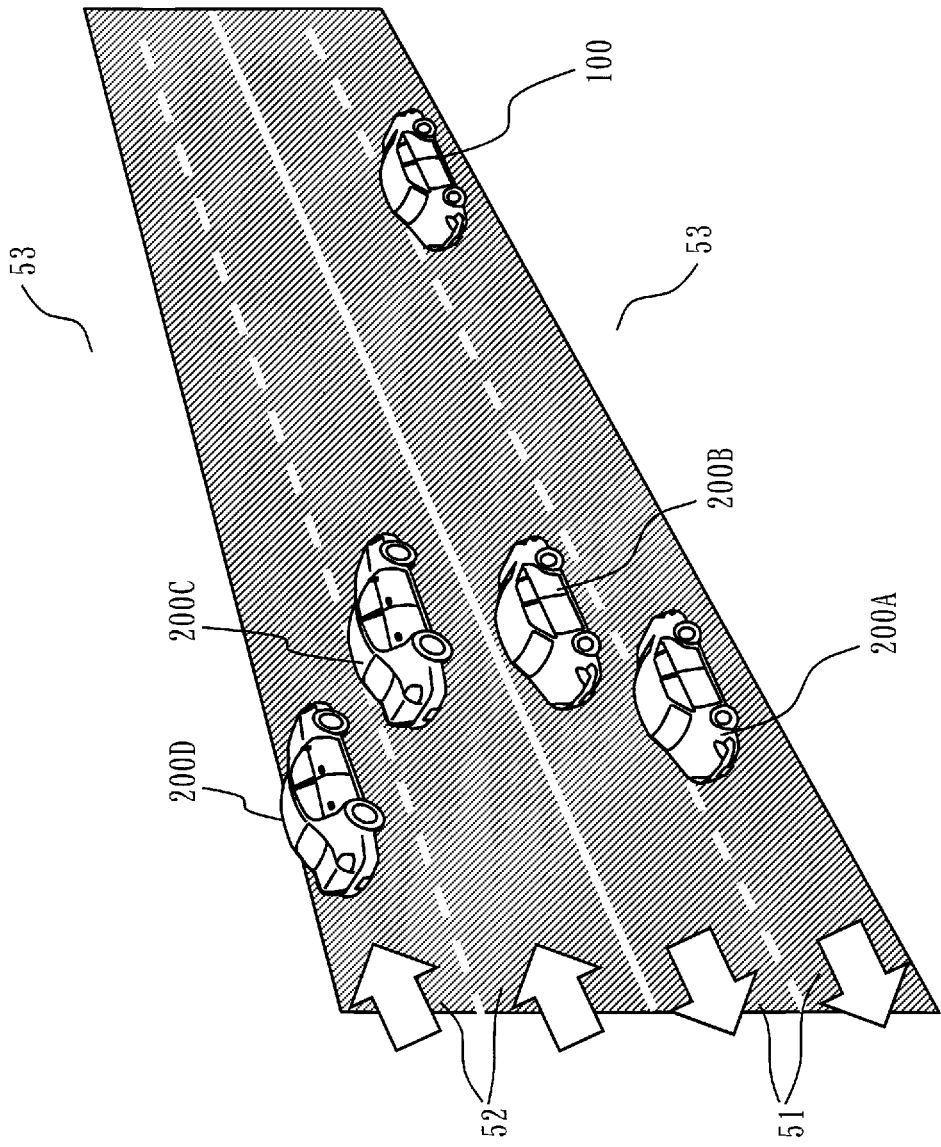
FIG. 14 is a diagram illustrating traveling states of the surrounding vehicles 200 according to the second embodiment.
Figure 15:
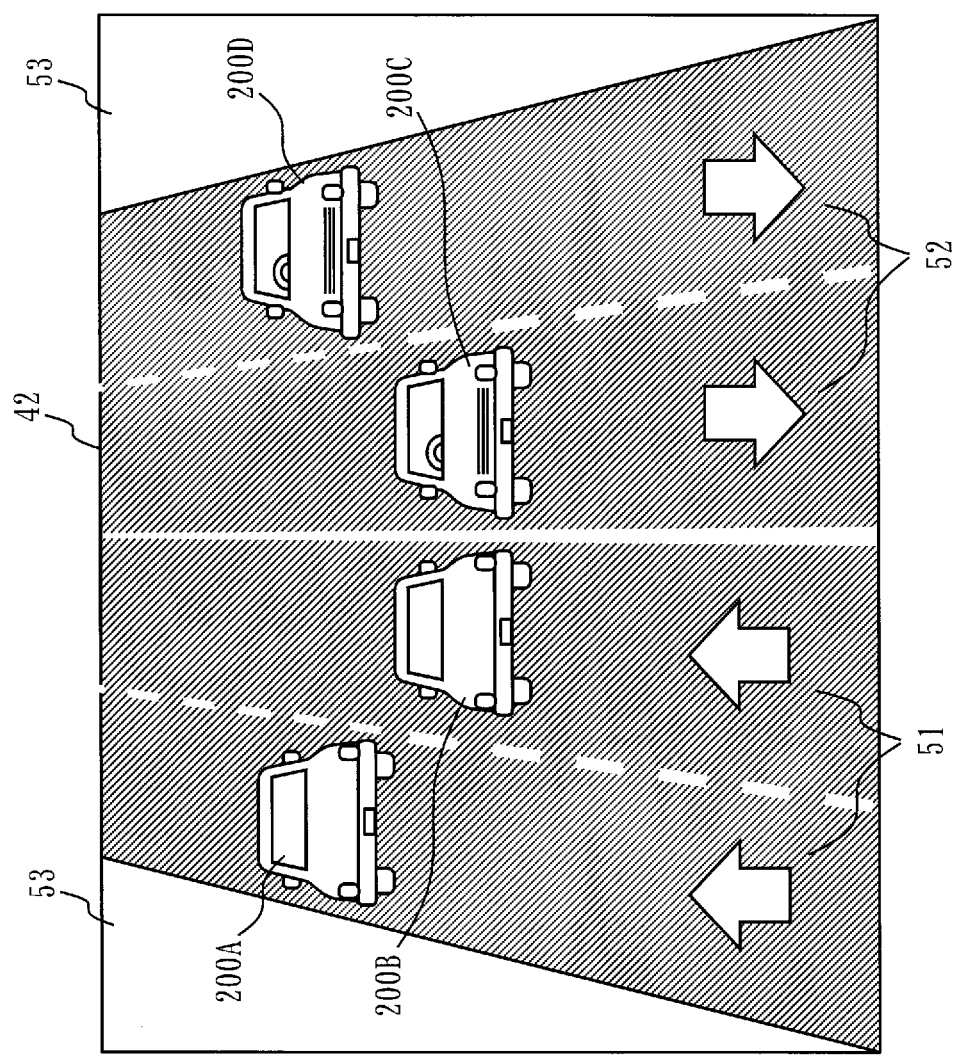
FIG. 15 is a diagram illustrating image information 42 that is obtained in a situation illustrated in FIG. 13 according to the second embodiment.

In each of FIGS. 13 and 14, a road with two lanes on each side is illustrated, and a surrounding vehicle 200 travels in each lane. The lane in which a vehicle 100 travels differs between FIG. 13 and FIG. 14. Specifically, while the vehicle 100 travels in the lane adjacent to an opposite lane 52 in FIG. 13, the vehicle 100 travels in the lane adjacent to a road shoulder 53 in FIG. 14. When the front of the vehicle 100 is photographed by a camera 31 mounted on the vehicle 100 in the situation illustrated in FIG. 13, image information 42 as illustrated in FIG. 15 is obtained. When the front of the vehicle 100 is photographed by the camera 31 mounted on the vehicle 100 in a situation illustrated in FIG. 14, image information 42 as illustrated in FIG. 16 is obtained.

Figure 16:
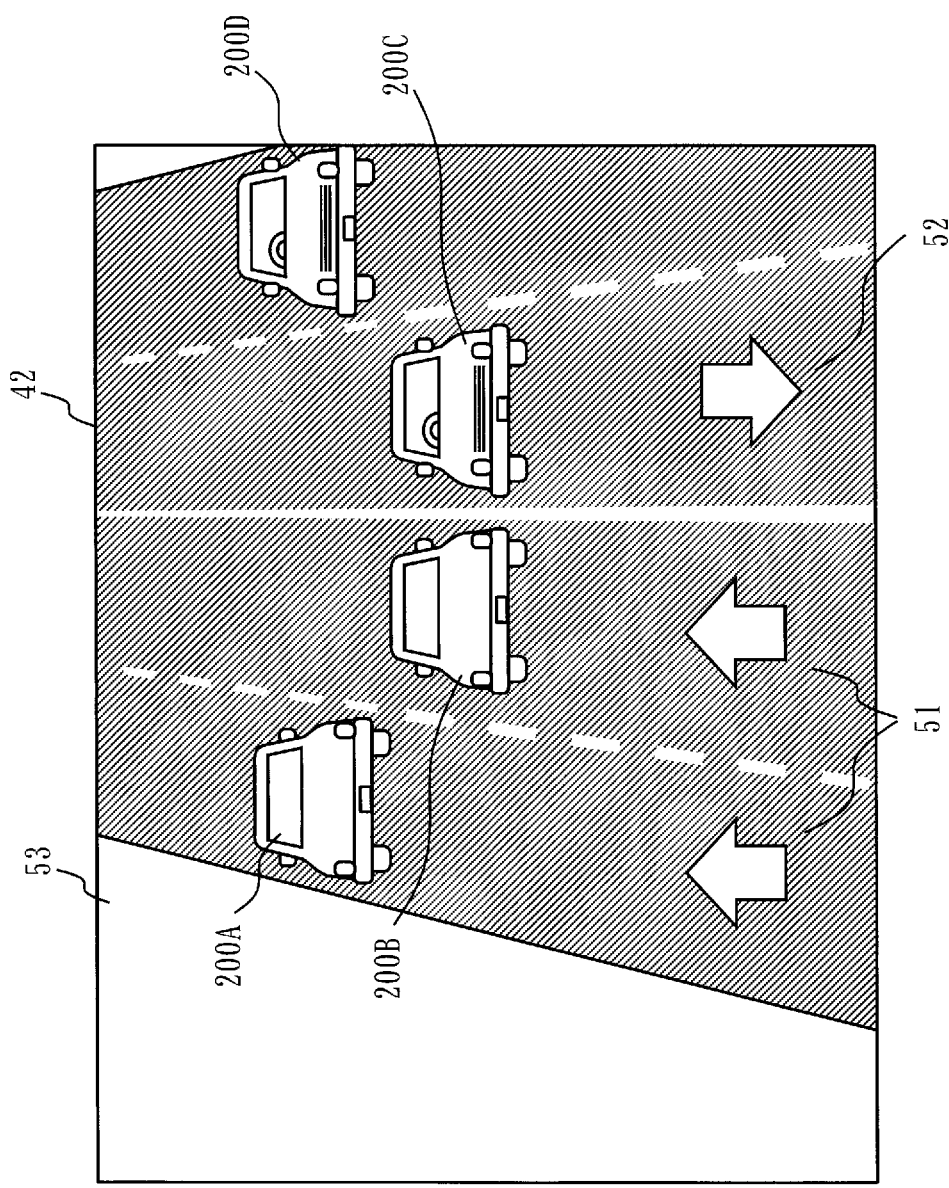
FIG. 16 is a diagram illustrating image information 42 that is obtained in a situation illustrated in FIG. 14 according to the second embodiment.

As illustrated in FIGS. 15 and 16, a region to be photographed differs according to the lane in which the vehicle 100 travels. Then, the vehicle determination apparatus 10 identifies the traveling direction of each surrounding vehicle 200 in consideration of the travel lane in which the vehicle 100 travels. Specifically, an approximately left half of the image information 42 is not simply set to be regions of parallel lanes 51 and an approximately right half of the image information 42 is not simply set to be regions of opposite lanes 52. Identification is made between the regions of the parallel lanes 51 and the regions of the opposite lanes 52 in the range of the image information 42, according to the travel lane.

The operations of the vehicle determination apparatus 10 according to the second embodiment will be described in detail, with reference to FIG. 17.

Figure 17:
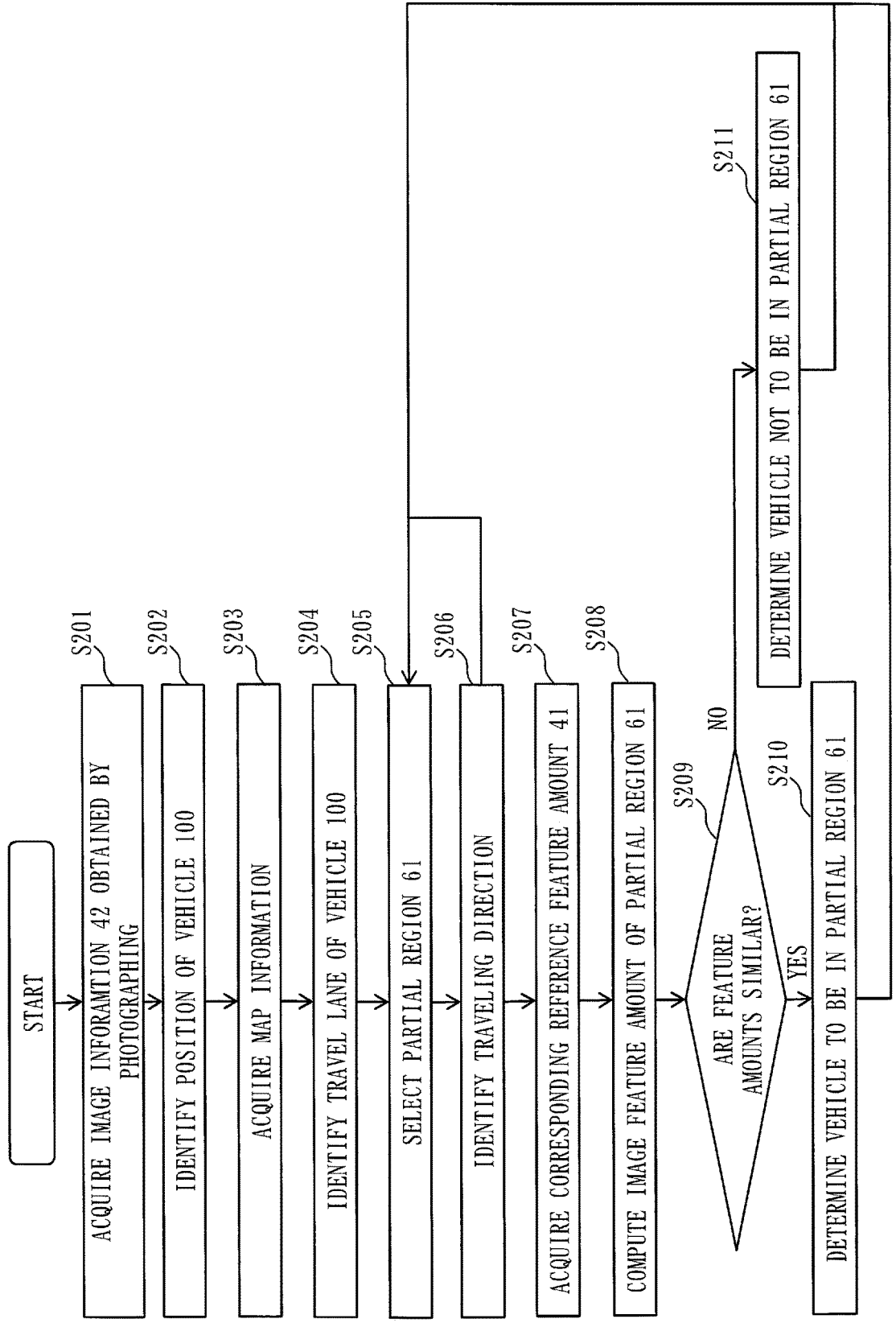
FIG. 17 is a flowchart illustrating operations of the vehicle determination apparatus 10 according to the second embodiment.

In the second embodiment, processes illustrated in FIG. 17 are repetitively executed for each certain period of time. The processes illustrated in FIG. 17 may be executed according to occurrence of an event.

Figure 7:
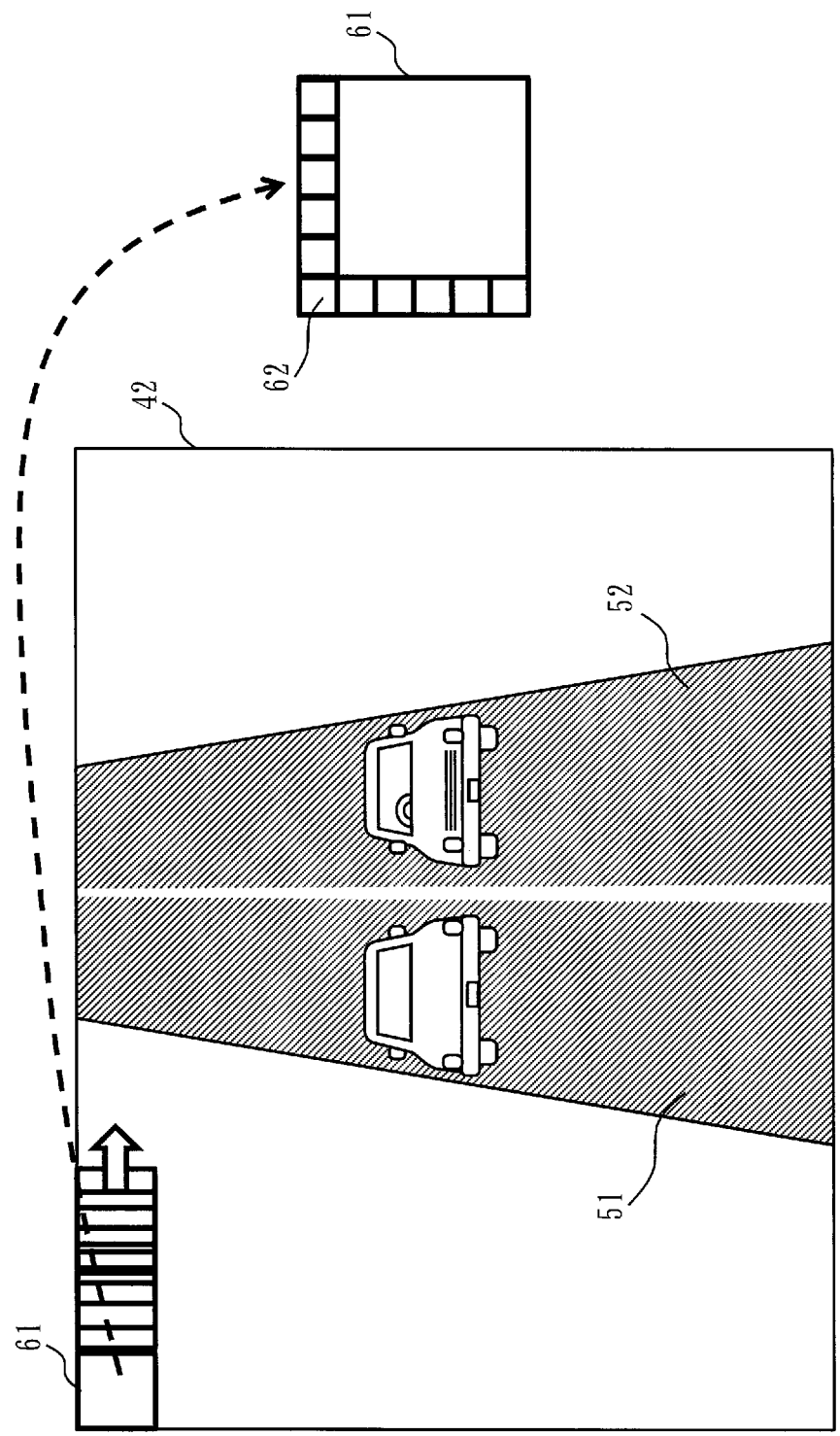
FIG. 7 is an explanatory diagram of a method of selecting a partial region 61 according to the first embodiment.

In a photographed image acquisition process in step S201, the direction identification unit 21 acquires image information 42, as in step S101 in FIG. 7.

In a position detection process in step S202, the lane identification unit 24 acquires a positioning signal via the positioning sensor 16, thereby identifying the position of a vehicle 100. Identification of the position of the vehicle 100 corresponds to identification of the position of a camera 31.

Specifically, the lane identification unit 24 receives the positioning signal from a positioning satellite such as a GPS via the positioning sensor 16 and receives, via the positioning sensor 16, positioning correction information for the positioning satellite from a quasi-zenith satellite that takes an orbit in which the quasi-zenith satellite stays in the sky over a specific region. The lane identification unit 24 corrects a position that is computed by the received positioning signal, using the positioning correction information and identifies the position. The lane identification unit 24 writes the identified position into the memory 121.

The positioning correction information is constituted from observation data at an electronic reference point set on the ground, satellite orbit information, a tropospheric delay model, and an ionospheric delay model. The tropospheric delay model indicates an effect that the speed of the radio wave of the positioning signal is reduced more in a troposphere close to the ground than in vacuum due to passage of the positioning signal through the atmosphere and an effect that the distance of a propagation path increases more than that of a direct line due to slight bending of the propagation path. The ionospheric delay model indicates an effect that the electron density of an ionosphere in the vicinity of the altitude of 250 to 400 km from the ground changes due to solar radiation, and the speed of the radio wave of the GPS positioning signal changes, depending on the electron density. Use of the positioning correction information can identify the position of the vehicle 100 with a precision of units of several centimeters if the road has no upper obstruction such as a tunnel.

Herein, the position of the photographing has been identified, using the positioning signal. However, it may be so arranged that a white line position on the road is detected, using a sensor such as a LIDAR (Light Detection and Ranging, Laser Imaging Detection and Ranging) sensor, and the position of the vehicle 100 is identified based on the white line position.

In a map acquisition process in step S203, the lane identification unit 24 acquires map information around the position of the vehicle 100 identified in step S202.

Specifically, the lane identification unit 24 reads the position identified in step S202 from the memory 121. Then, the lane identification unit 24 receives, from an external server, the map information around the position identified in step S202, via the communication interface 15. The map information is information having a precision with which the position of each lane in the road can be identified. Three-dimensional shape information of the road may be included in the map information. The lane identification unit 24 writes the received map information into the memory 121.

Herein, the lane identification unit 24 has received the map information from the external server. However, the map information may be stored in the storage 122, and the lane identification unit 24 may read the map information from the storage 122.

In a travel lane identification process in step S204, the lane identification unit 24 identifies a travel lane in which the vehicle 100 travels.

A specific description will be given with reference to FIG. 18. The lane identification unit 24 reads, from the memory 121, the position of the vehicle 100 identified in step S202 and the map information acquired in step S203. The lane identification unit 24 compares the position of the vehicle 100 with the position of each lane indicated by the map information, thereby identifying the travel lane.

Figure 18:
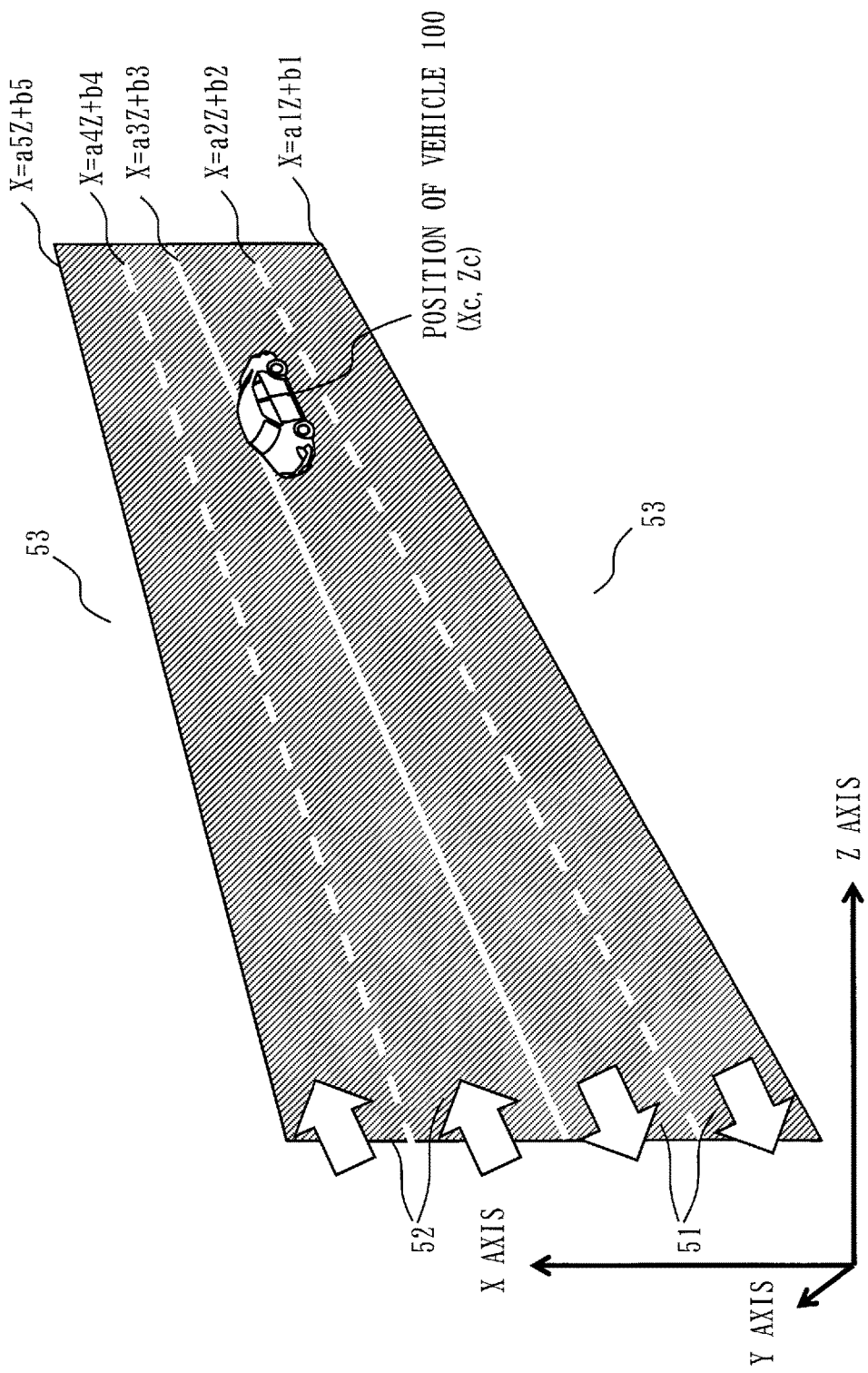
FIG. 18 is an explanatory diagram of a method of identifying a travel lane of a vehicle 100 according to the second embodiment.

Assume, for example, that the map information is a numerical expression indicating each line that delimits the lanes, as illustrated in FIG. 18. Referring to FIG. 18, each line is assumed to be a direct line, and each line is expressed by $X=aZ+b$. Herein, each of a and b is a constant, and a different value is set for each line. The lane identification unit 24 identifies the travel lane of the vehicle 100, using the numerical expression indicated by the map information and the position of the vehicle 100 (Xc, Zc). The lane identification unit 24 writes, into the memory 121, travel lane information 45 indicating the identified travel lane.

In a region selection process in step S205, the direction identification unit 21 selects a partial region 61 of a region indicated by the image information 42 acquired in step S201, as in step S102 in FIG. 6.

In a direction identification process in step S206, the direction identification unit 21 identifies a traveling direction in which a surrounding vehicle 200 travels in the partial region 61 selected in step S205.

Specifically, the direction identification unit 21 reads, from the memory 121, the partial region 61 selected in step S205 and the travel lane information 45 indicating the travel lane identified in step S204. The direction identification unit 21 determines whether the partial region 61 is a region of a parallel lane 51, a region of an opposite lane 52, or a region of neither the parallel lane 51 nor the opposite lane 52, in consideration of the travel lane indicated by the travel lane information 45 that has been read.

If the partial region 61 has been determined to be the region of the parallel lane 51 or the opposite lane 52, the direction identification unit 21 causes the procedure to proceed to step S207. If the partial region 61 has been determined to be region of neither the parallel lane 51 nor the opposite lane 52, the direction identification unit 21 returns the procedure to step S205 and selects another partial region 61.

Figure 19:
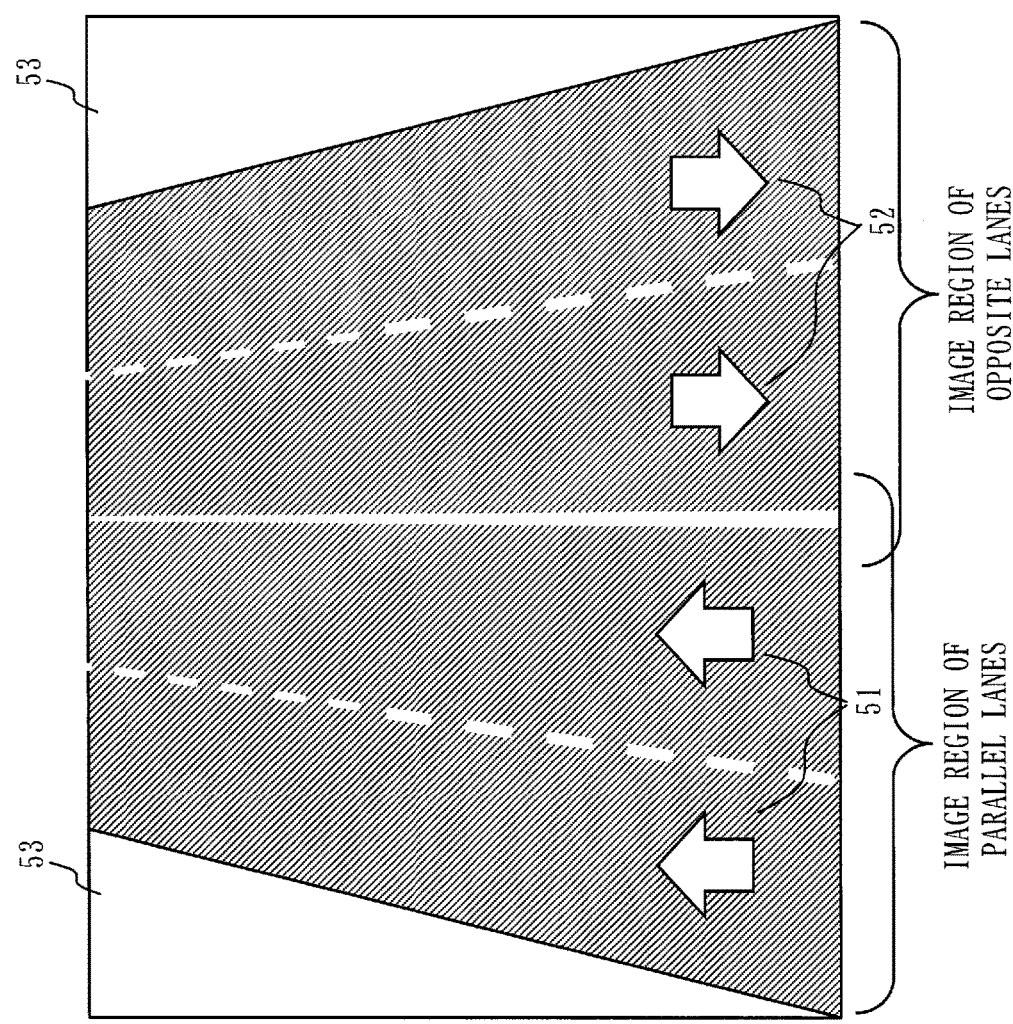
FIG. 19 is an explanatory diagram of a determination method of a partial region 61 according to the second embodiment.
Figure 20:
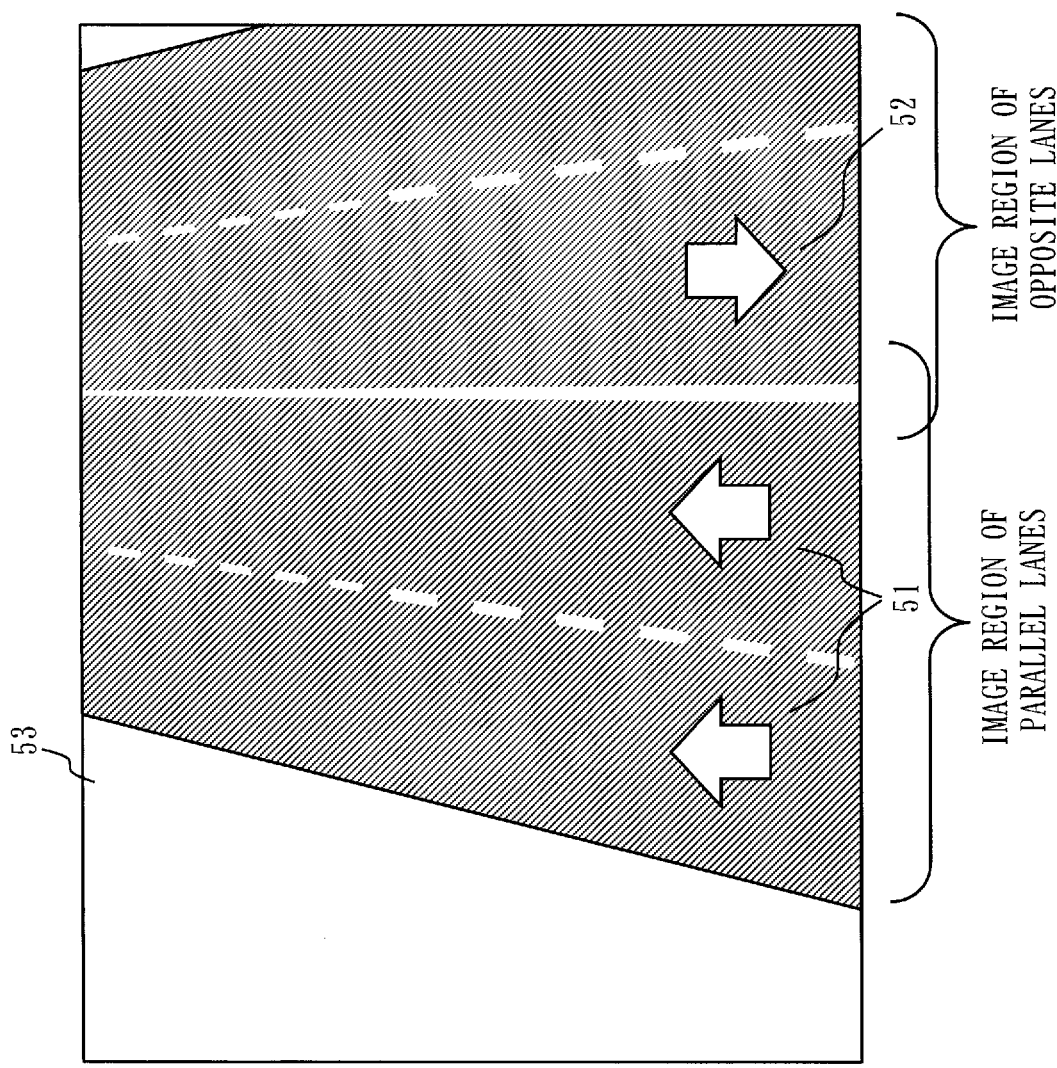
FIG. 20 is an explanatory diagram of the determination method of the partial region 61 according to the second embodiment.

A method of determining whether the partial region 61 is the region of the parallel lane 51, the region of the opposite lane 52, or the region of neither the parallel lane 51 nor the opposite lane 52 with reference to FIGS. 19 and 20.

When the vehicle 100 travels in the lane adjacent to a road shoulder 53, a photographed region of a road 50 is shifted to the right by an amount corresponding to one lane, as illustrated in FIG. 19 and FIG. 20, as compared with a case where the vehicle 100 travels in the lane adjacent to the opposite lane 52.

Then, the direction identification unit 21 sets the region of the parallel lane 51 and the region of the opposite lane 52 for each travel lane of the vehicle 100. When the vehicle 100 travels in the lane adjacent to the opposite lane 52, for example, the direction identification unit 21 sets, as the parallel lane 51, a region from the left end to the center position or a position on a slightly right side of the center position of the image information 42, and sets, as the opposite lane 52, a region from the right end to the center position or a position on a slightly left side of the center position of the image information 42. When the vehicle 100 travels in the lane adjacent to the road shoulder 53, the direction identification unit 21 sets, as the parallel lane 51, a region from a position moved to the right from the left end of the image information 42 by one lane to a position moved to the right from the center position by one lane or a position moved to the right from the slightly right side of the center position by one lane, and sets, as the opposite lane 52, a range on the right side of the parallel lane 51.

The direction identification unit 21 determines whether the partial region 61 is the region of the parallel lane 51, the region of the opposite lane 52, or the region not included in neither the parallel lane 51 nor the opposite lane 52, according to whether the partial region 61 includes a region of the parallel lane 51, includes a region of the opposite lane 52, or includes neither the region of the parallel lane 51 nor the region of the opposite lane 52.

The processes from step S207 to step S211 are the same as the processes from step S104 to step S108 illustrated in FIG. 6.

Figure 21:
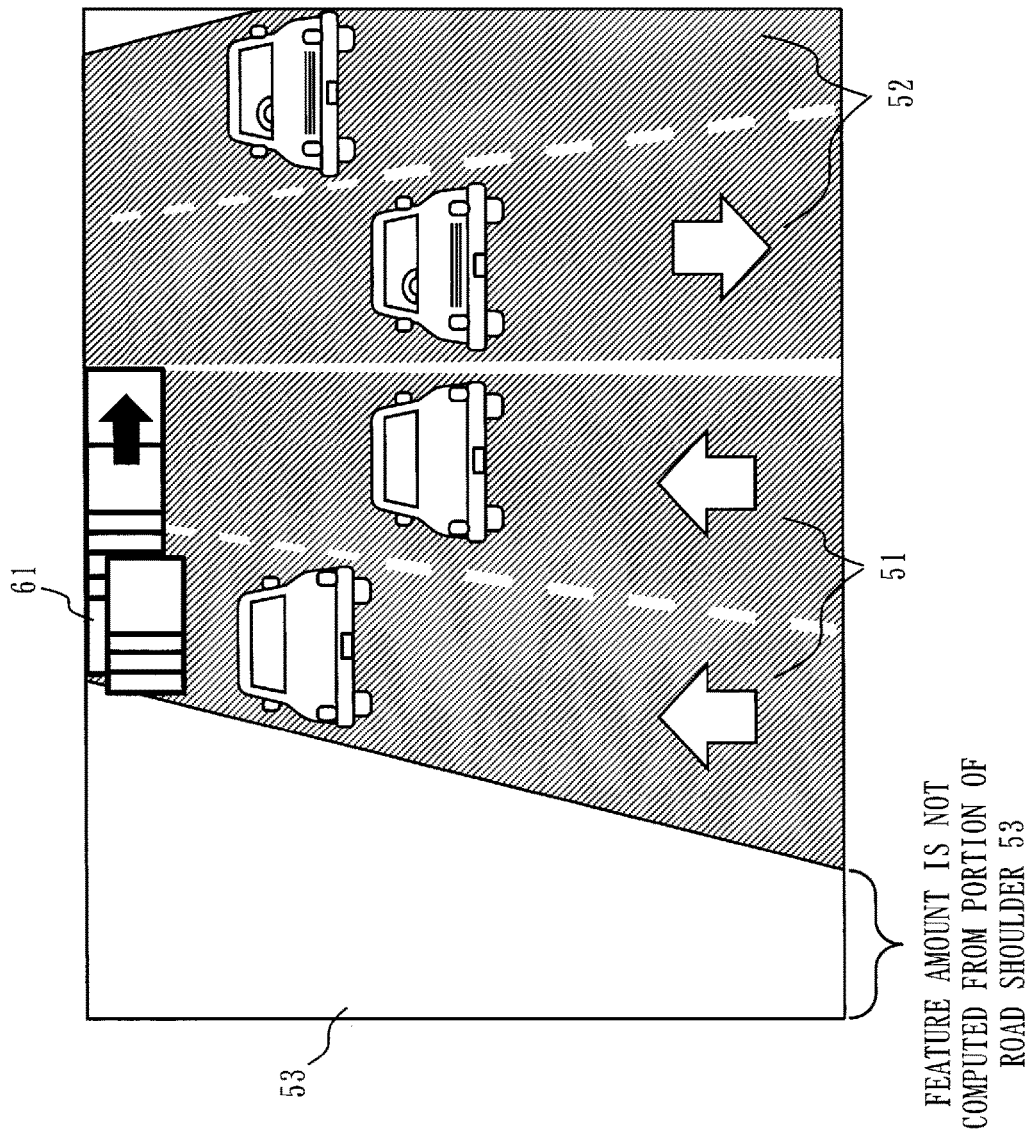
FIG. 21 is an explanatory diagram with respect to similarity determination of a feature amount according to the second embodiment.

That is, only when the partial region 61 includes the region of the parallel lane 51 or the region of the opposite lane 52, as illustrated in FIG. 21, the processes after step S207 are executed. In other words, when the partial region 61 is not included in neither the region of the parallel lane 51 nor the region of the opposite lane 52 as in a case where the partial region 61 is a road shoulder, the processes after step S207 are omitted, and computation of a feature amount and so on are not performed.

Effect of Second Embodiment

As mentioned above, the vehicle determination apparatus 10 according to the second embodiment identifies the travel lane of the vehicle 100, thereby identifying the parallel lane 51 and the opposite lane 52 with good accuracy.

With this arrangement, the processes after step S207 are omitted for a region such as the road shoulder 53 where no surrounding vehicle 200 travels. Therefore, the surrounding vehicle 200 can be detected from the image information 42 at high speed. Further, similarity determination of the feature amount is made, using an appropriate reference feature amount 41. Therefore, the surrounding vehicle 200 can be detected from the image information 42 with good accuracy.

Alternative Configuration

Third Variation Example

In the second embodiment, the travel lane of the vehicle 100 has been identified in step S204, and the region of the parallel lane 51 and the region of the opposite lane 52 have been identified in step S206, in consideration of the travel lane. As a third variation example, the region of a parallel lane 51 and the region of an opposite lane 52 in a region indicated by image information 42 may be identified, using the position of a vehicle 100 and map information.

Figure 22:
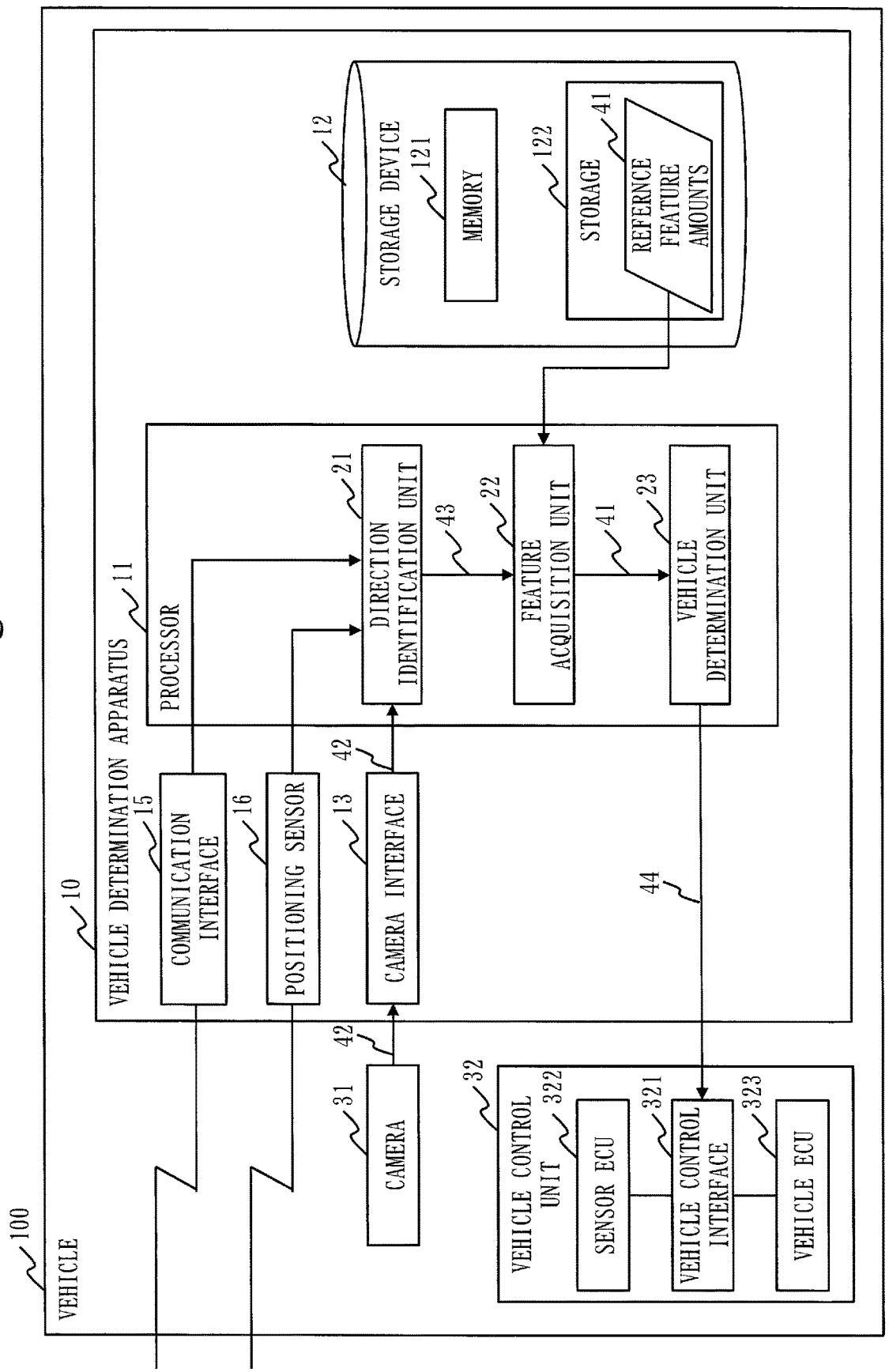
FIG. 22 is a configuration diagram of a vehicle determination apparatus 10 according to a third variation example.

A configuration of a vehicle determination apparatus 10 according to the third variation example will be described, with reference to FIG. 22.

Figure 12:
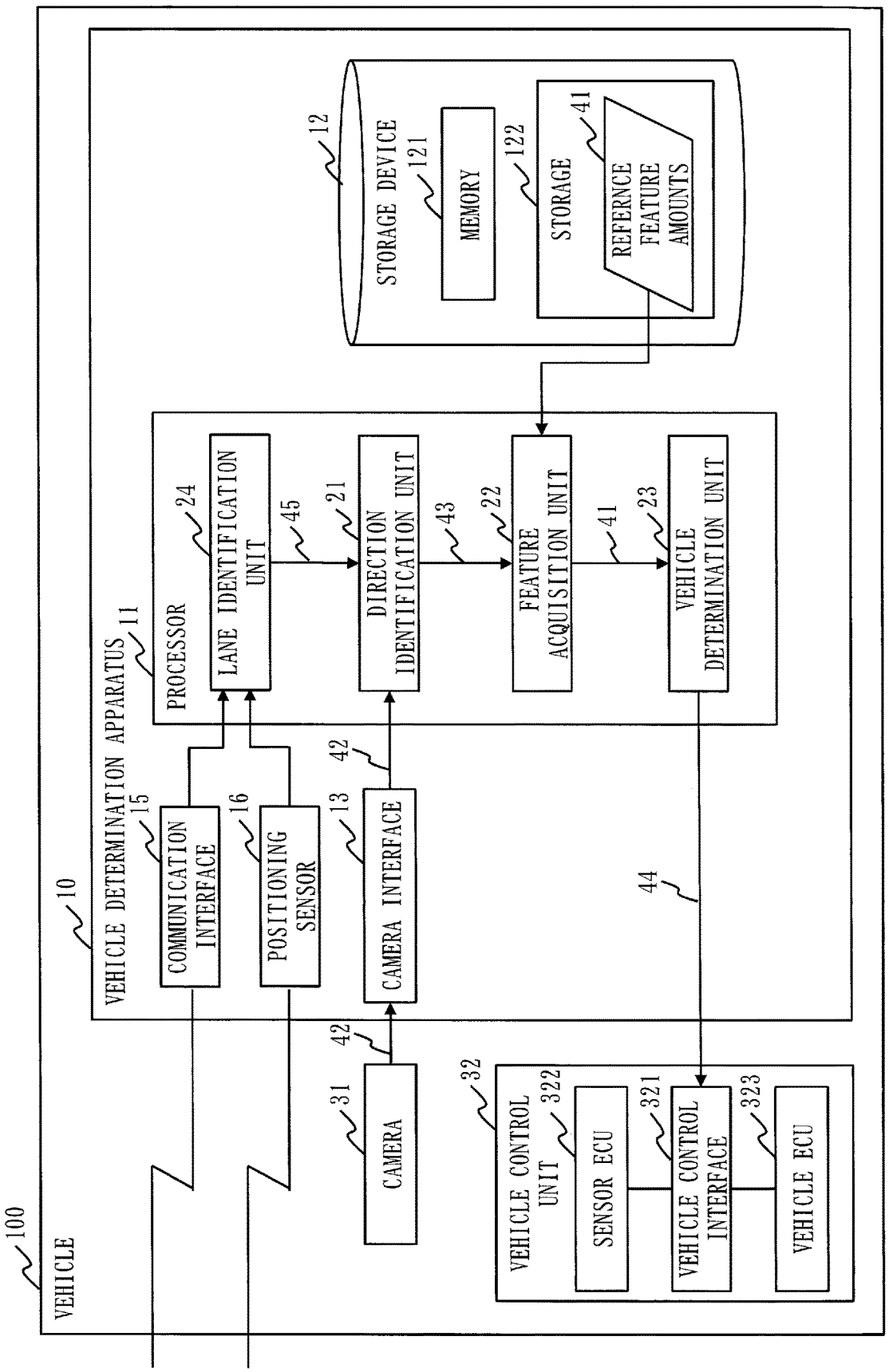
FIG. 12 is a configuration diagram of a vehicle determination apparatus 10 according to a second embodiment.

The vehicle determination apparatus 10 is different from the vehicle determination apparatus 10 illustrated in FIG. 12 in that the vehicle determination apparatus 10 does not include the lane identification unit 24 as a functional component.

Operations of the vehicle determination apparatus 10 according to the third variation example will be described with reference to FIG. 23.

Figure 23:
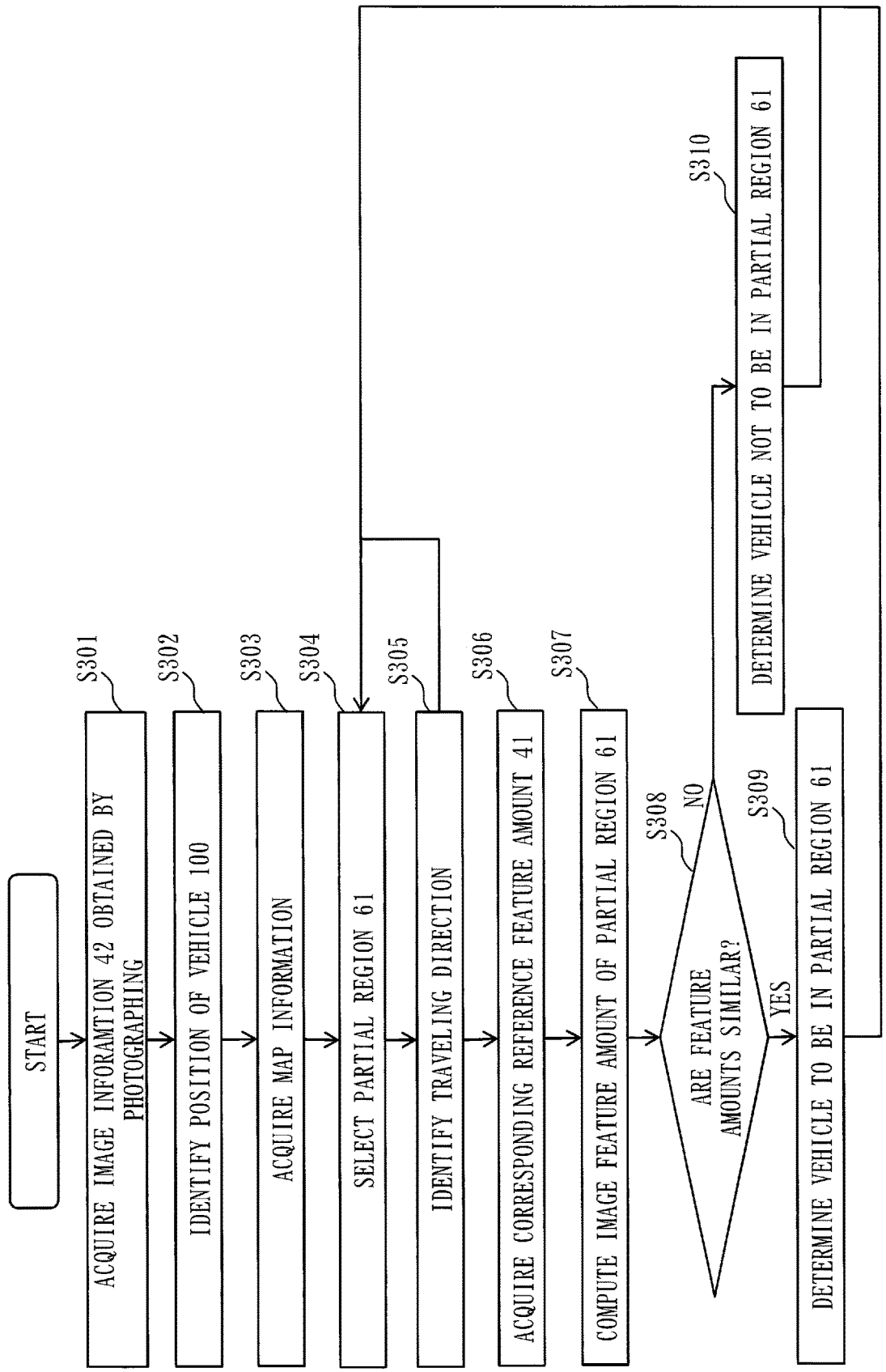
FIG. 23 is a flowchart illustrating operations of the vehicle determination apparatus 10 according to the third variation example.

In the third variation example, processes illustrated in FIG. 23 are repetitively executed for each certain period of time. The processes illustrated in FIG. 23 may be executed according to occurrence of an event.

The processes from step S301 to step S303 are the same as the processes from step S201 to step S203 in FIG. 17. In step S202, the lane identification unit 24 has identified the position of the vehicle 100, and in step S203, the lane identification unit 24 has acquired the map information. However, in step S302, the direction identification unit 21 identifies the position of a vehicle 100, and in step S303, the direction identification unit 21 acquires map information.

The process in step S304 is the same as the process in step S205 in FIG. 17. The processes from step S306 to step S310 are the same as the processes from step S207 to step S211 in FIG. 17.

In a direction identification process in step S305, the direction identification unit 21 identifies a traveling direction in which a surrounding vehicle 200 travels in a partial region 61 from the position of the vehicle 100 identified in step S302 and the map information acquired in step S303.

Figure 24:
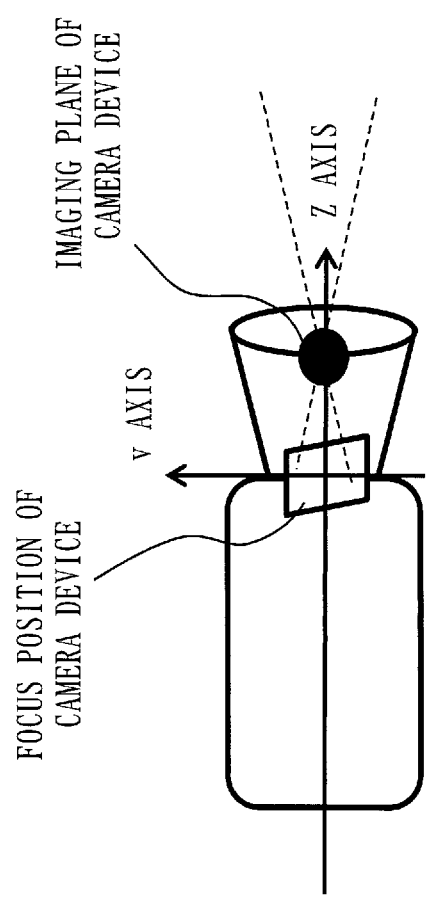
FIG. 24 is an explanatory diagram of a method of identifying a travel lane of a vehicle 100 according to the third variation example.
Figure 25:
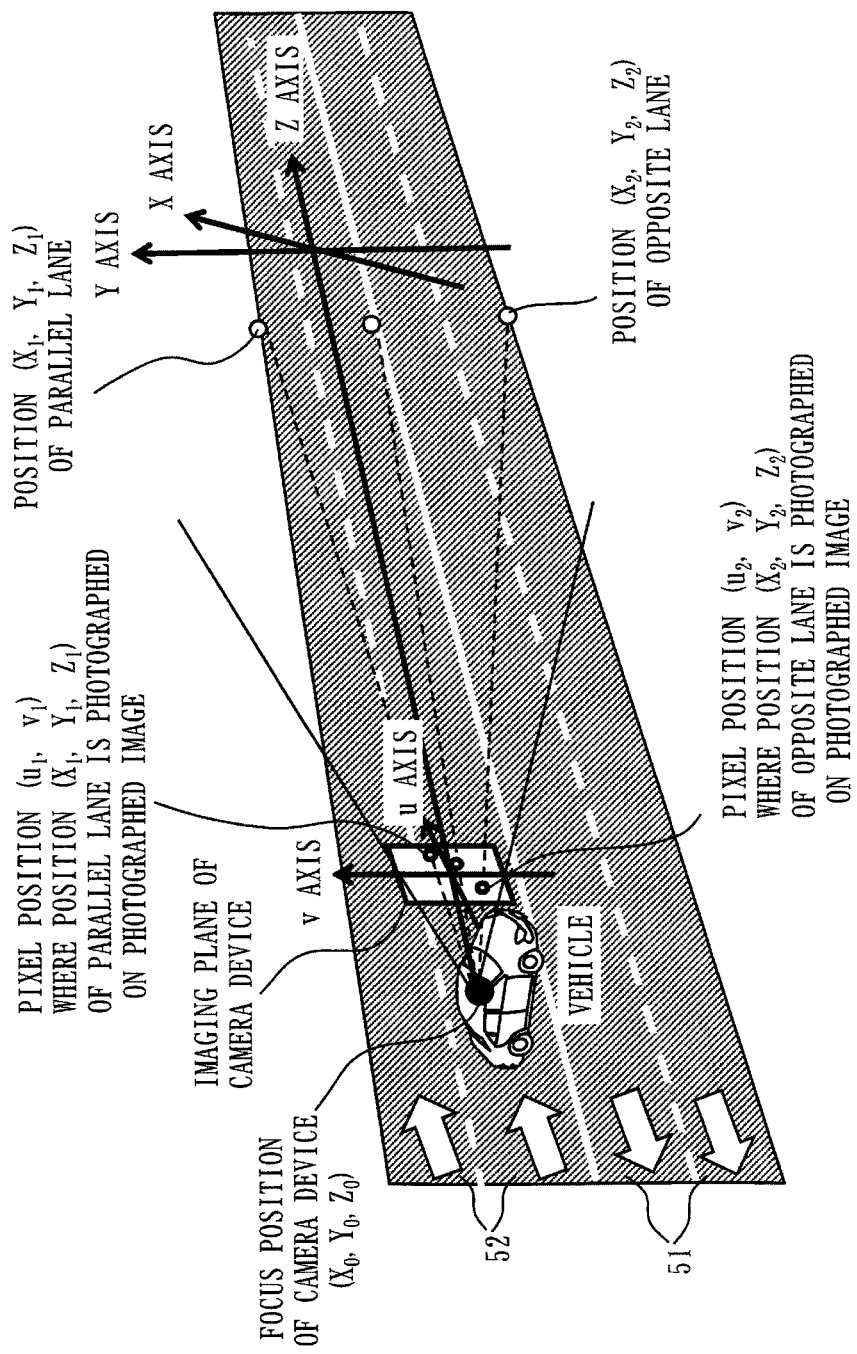
FIG. 25 is an explanatory diagram of the method of identifying the travel lane of the vehicle 100 according to the third variation example.

A specific description will be given with reference to FIG. 24 and FIG. 25.

The direction identification unit 21 identifies a focus position $(X_0, Y_0, Z_0)$ of the camera 31 when photographing is performed. The focus position $(X_0, Y_0, Z_0)$ of the camera 31 is identified from the position of the vehicle 100 and a setting parameter of the camera 31 such as a focal length for each pixel.

The direction identification unit 21 acquires, from the map information, positions $(X_1, Y_1, Z_1)$ of some boundary portions of a parallel lane 51 and positions $(X_2, Y_2, Z_2)$ of some boundary portions of an opposite lane 52, and then computes relative positions with respect to the focus position $(X_0, Y_0, Z_0)$ of the camera 31. If the focus position of the camera 31 is an origin $(0, 0, 0)$, a relative position of the parallel lane 51 becomes $(X_1, Y_1, Z_1)$, and a relative position of the opposite lane 52 becomes $(X_2, Y_2, Z_2)$. The direction identification unit 21 computes a pixel position $(u_1, v_1)$ obtained by projecting the relative position $(X_1, Y_1, Z_1)$ of the parallel lane 51 on the imaging plane of the camera 31 by a perspective projective transformation process. Similarly, the direction identification unit 21 computes a pixel position $(u_2, v_2)$ obtained by projecting the relative position $(X_2, Y_2, Z_2)$ of the opposite lane 52 on the imaging plane of the camera 31 by the perspective projective transformation process.

The direction identification unit 21 computes each pixel position $(u_1, v_1)$ with respect to the positions of the boundary positions $(X_1, Y_1, Z_1)$ and computes each pixel position $(u_2, v_2)$ with respect to the positions of the boundary positions $(X_2, Y_2, Z_2)$. Then, the direction identification unit 21 sets a range to be identified from the respective positions $(u_1, v_1)$ as the region of the parallel lane 51, and sets a range to be identified from the respective positions $(u_2, v_2)$ as the region of the opposite lane 52. As a specific example, the direction identification unit 21 connects the positions $(u_1, v_1)$ that are adjacent to each other, and sets a range enclosed by the adjacent positions $(u_1, v_1)$ to the region of the parallel lane 51, and connects the positions $(u_2, v_2)$ that are adjacent to each other, and sets a range enclosed by the adjacent positions $(u_2, v_2)$ to the region of the opposite lane 52.

Herein, an equation for perspective projective transformation is as given by Expression 1. $f_x$ and $f_y$ indicate a focal length for each pixel, which is the setting parameter of the camera 31. The pixel position $(u_1, v_1)$ indicates a pixel position when the center of the imaging plane of the camera device (center position of a photographed image) is set to the position of an origin (0, 0).

$$\begin{bmatrix} u_1 \\ v_1 \end{bmatrix} = \begin{bmatrix} f_x & 0 \\ 0 & f_y \end{bmatrix} \begin{bmatrix} \frac{X_1}{Z_1} \\ \frac{Y_1}{Z_1} \end{bmatrix}$$ [Expression 1]

With this arrangement, the region of the parallel lane 51 and the region of the opposite lane 52 can be more accurately identified. As a result, the surrounding vehicle 200 can be detected from the image information 42 at high speed and with good accuracy.

Third Embodiment

A third embodiment is different from the first and second embodiments in that similarity determination of a feature amount is made, using a reference feature amount 41 corresponding to the position of an associated lane being a lane of a partial region 61.

Description of Configuration

A configuration of a vehicle determination apparatus 10 according to the third embodiment will be described, with reference to FIG. 26.

The vehicle determination apparatus 10 is different from the vehicle determination apparatus 10 illustrated in FIG. 12 in that the lane identification unit 24 delivers associated lane information 46 to the feature acquisition unit 22.

Description of Operations

Operations of the vehicle determination apparatus 10 according to the third embodiment will be described with reference to FIGS. 27 to 29.

The operations of the vehicle determination apparatus 10 according to the third embodiment correspond to a vehicle determination method according to the third embodiment. The operations of the vehicle determination apparatus 10 according to the third embodiment correspond to a vehicle determination program procedure according to the third embodiment.

Figure 27:
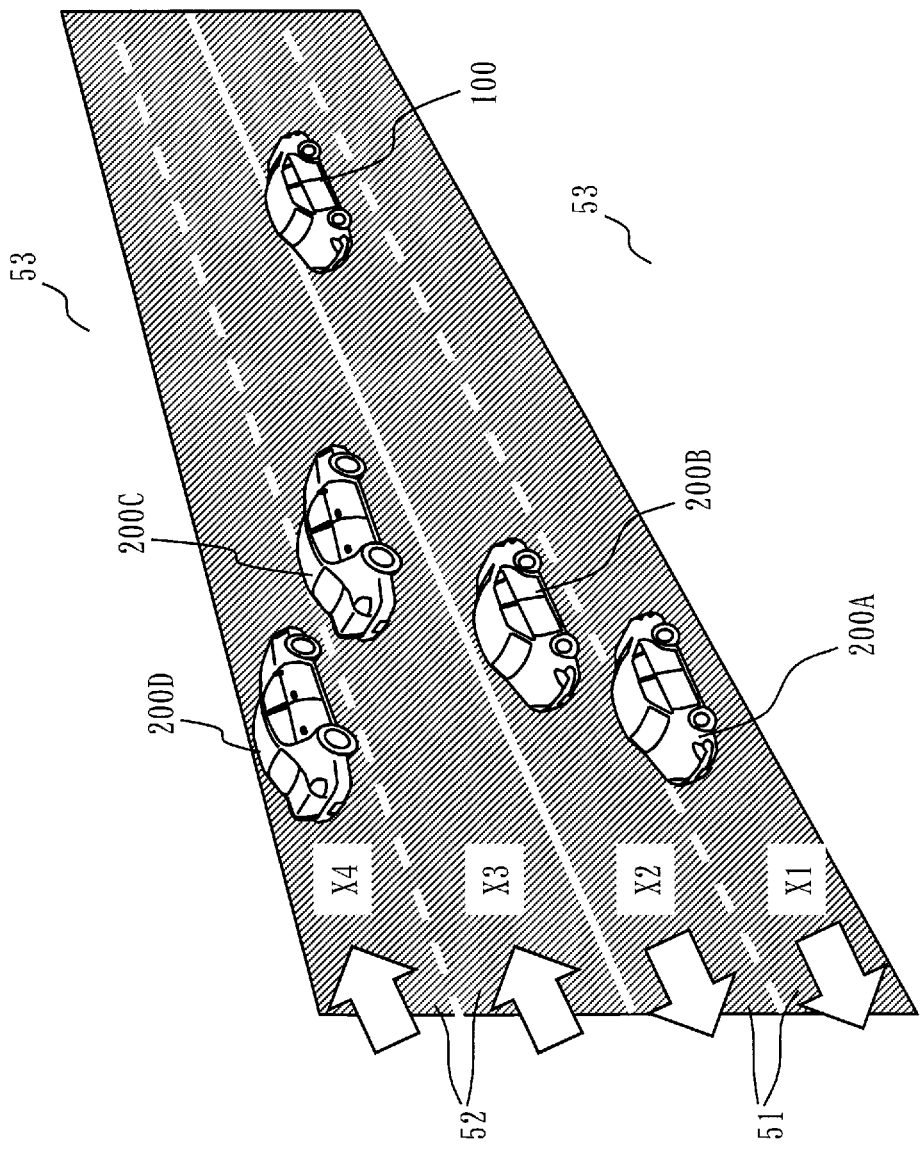
FIG. 27 is a diagram illustrating traveling states of surrounding vehicles 200 according to the third embodiment.

The operations of the vehicle determination apparatus 10 according to the third embodiment will be outlined with reference to FIG. 27.

Referring to FIG. 27, lanes X1 and X2 are parallel lanes 51, while lanes X3 and X4 are opposite lanes 52. It is assumed that the travel lane of a vehicle 100 is the lane X2, in FIG. 27.

In this case, a right oblique rear portion of a surrounding vehicle 200A that travels in the lane X1 is photographed. The rear of a surrounding vehicle 200B that travels in the lane X2 is photographed. A right oblique front portion of a surrounding vehicle 200C that travels in the lane X3 is photographed. A right oblique front portion of a surrounding vehicle 200D that travels in the lane X4, which is closer to a side portion of the surrounding vehicle 200D than in the case of the surrounding vehicle 200C that travels in the lane X3, is photographed.

That is, according to the relative travel position of each surrounding vehicle 200 with respect to the vehicle 100, a photographed angle differs. Then, the vehicle determination apparatus 10 stores a reference feature amount 41, for each relative position of an associated lane with respect to the travel lane of the vehicle 100 and associated with each partial region 61. Then, using the reference feature amount 41 corresponding to the relative position of the associated lane with respect to the travel lane of the vehicle 100 and associated with the partial region 61, the vehicle determination apparatus 10 determines whether or not the surrounding vehicle 200 is present in the partial region 61 to be processed.

The reference feature amount 41 according to the third embodiment will be described, with reference to FIG. 28.

The reference feature amount 41 is computed using reference images corresponding to a target photographing direction and the relative position of an associated lane with respect to the travel lane. In FIG. 28, the reference feature amounts 41 of eight classes constituted from combinations of two photographing directions of the rear of a vehicle and the front of a vehicle and four relative positions of a same lane, a left-adjacent lane, a right-adjacent lane, and a second right-adjacent lane are computed. The second right-adjacent lane is a lane located to the right of the travel lane by two lanes.

The reference feature amount 41 corresponding to each class is stored in the storage 122, being associated with each class as illustrated in FIG. 28.

In the case of driving to the left of a road, it does not happen in principle that the surrounding vehicle 200 that travels in the opposite lane 52 travels in the same lane and the left-adjacent lane. Therefore, the reference feature amounts 41 for the front of the vehicle corresponding to the same lane and the left-adjacent lane do not need to be stored. Further, in the case of two lanes on each side of a road, it does not happen in principle that the surrounding vehicle 200 that travels in the parallel lane 51 travels in the second-right adjacent lane. Therefore, the reference feature amount 41 for the rear of the vehicle corresponding to the second right-adjacent lane does not need to be stored.

The operations of the vehicle determination apparatus 10 according to the third embodiment will be described in detail, with reference to FIG. 29.

Figure 29:
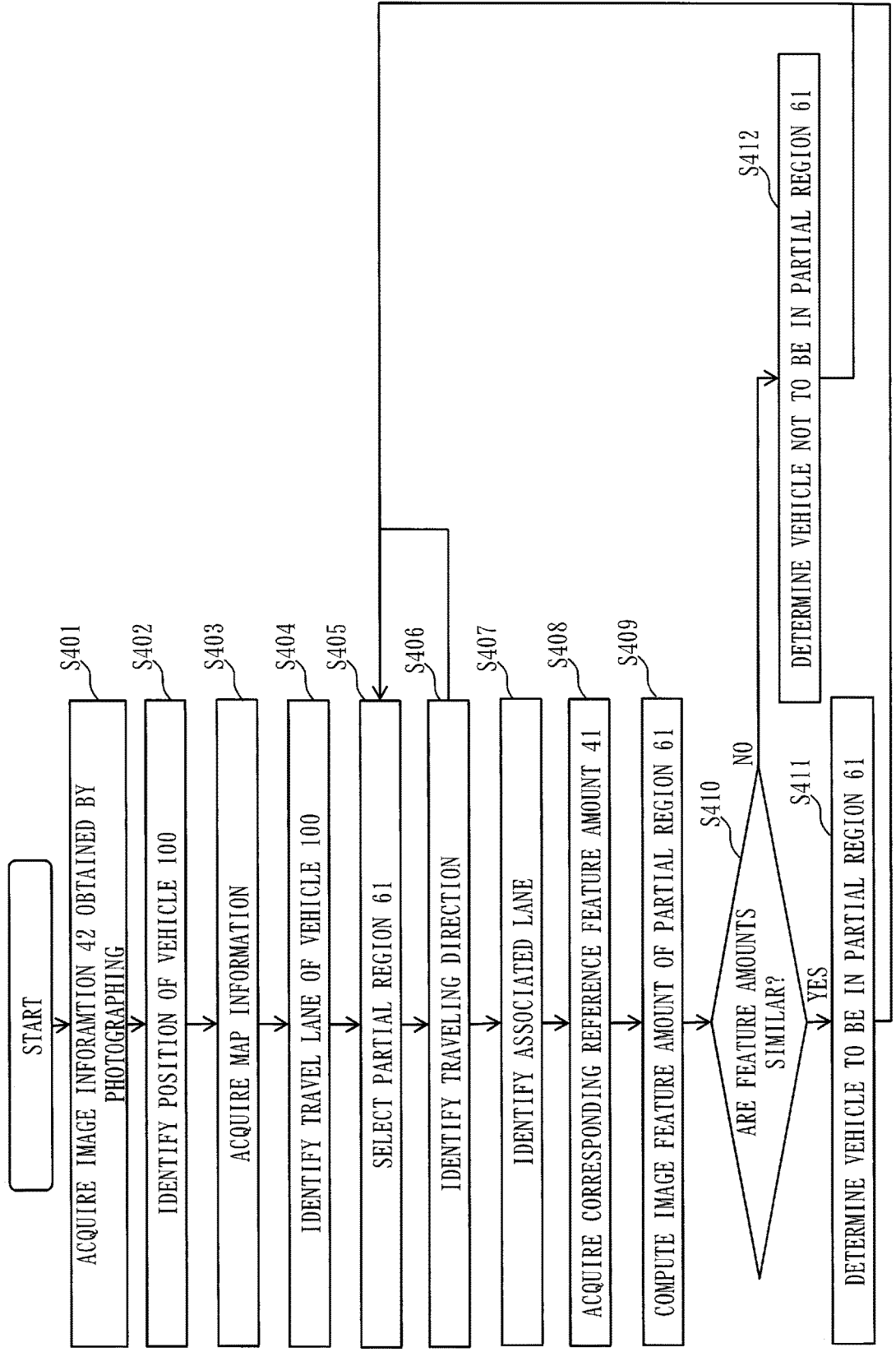
FIG. 29 is a flowchart illustrating operations of the vehicle determination apparatus 10 according to the third embodiment.

In the third embodiment, processes illustrated in FIG. 29 are repetitively executed for each certain period of time. The processes illustrated in FIG. 29 may be executed according to occurrence of an event.

The processes from step S401 to step S406 are the same as the processes from step S201 to step S206 illustrated in FIG. 17. The processes in step S409 to step S412 are the same as the processes in step S208 to step S211 illustrated in FIG. 17.

In an associated lane identification process in step S407, the lane identification unit 24 identifies an associated lane associated with a partial region 61 selected in step S405.

Specifically, the lane identification unit 24 identifies a range of each lane on the imaging place of a camera 31 using the method described with reference to FIG. 24 and FIG. 25 in the third variation example. That is, though the region of the parallel lane 51 and the region of the opposite lane 52 on the imaging plane of the camera 31 have been identified in the third variation example, the range of each lane on the imaging plane of the camera 31 is identified herein. As a specific example, when there are two lanes of parallel lanes 51, the region of each of the two lanes constituting the parallel lanes 51 are identified. Then, the lane identification unit 24 identifies the associated lane according to whether the partial region 61 includes which lane's region. The lane identification unit 24 writes the identified associated lane into the memory 121.

If the partial region 61 includes regions of two lanes, both of the two lanes are identified as associated lanes.

In a feature amount acquisition process in step S408, the feature acquisition unit 22 acquires a reference feature amount 41 corresponding to the traveling direction of a surrounding vehicle 200 identified in step S406 and the associated lane identified in step S407. That is, the feature acquisition unit 22 acquires the reference feature amount 41 corresponding to the traveling direction of the surrounding vehicle 200 and the relative position of the associated lane with respect to a travel lane. The feature acquisition unit 22 writes, into the memory 121, the reference feature amount 41 that has been read.

As a specific example, when the traveling direction of the surrounding vehicle 200 is the same as that of a vehicle 100 and the associated lane is the left-adjacent lane of the travel lane, the feature acquisition unit 22 acquires the reference feature amount 41 corresponding to the same direction as that of the vehicle 100 and the left-adjacent lane. That is, the feature acquisition unit 22 reads a reference feature amount 41C in FIG. 28 from the storage 122.

When the partial region 61 includes regions of two lanes, the feature acquisition unit 22 acquires the reference feature amounts 41 corresponding to both of two associated lanes.

Effect of Third Embodiment

As mentioned above, the vehicle determination apparatus 10 according to the third embodiment determines whether or not the surrounding vehicle 200 is photographed in the partial region 61, using the reference feature amount 41 corresponding to the traveling direction of the surrounding vehicle 200 in the partial region 61 and the relative position of the associated lane with respect to the travel lane. With this arrangement, the surrounding vehicle 200 can be detected from image information 42 at high speed and with high accuracy.

Alternative Configurations

Fourth Variation Example

In the third embodiment, classification of the reference feature amount 41 has been performed, according to the relative position of the associated lane with respect to the travel lane. As a fourth variation example, classification of a reference feature amount 41 may be performed according to a distance between a vehicle 100 and each surrounding vehicle 200 in a traveling direction as well as the relative position of an associated lane with respect to a travel lane.

To take an example, even if the surrounding vehicle 200 is the one that travels in a left-adjacent lane, an angle at which the surrounding vehicle 200 is photographed differs between when the surrounding vehicle 200 is positioned separated from the vehicle 100 and when the surrounding vehicle 200 is positioned close to the vehicle 100.

Then, the vehicle determination apparatus 10 classifies each reference feature amount 41 according to the distance between the vehicle 100 and the surrounding vehicle 200 in the traveling direction as well the relative position of the associated lane with respect to the travel lane and stores the classified reference feature amount 41 in the storage 122. Then, the feature acquisition unit 22 acquires the reference feature amount 41 corresponding to the distance between the vehicle 100 and the surrounding vehicle 200 in the traveling direction.

Herein, the surrounding vehicle 200 positioned separated from the vehicle 100 is photographed in an upper region of image information 42, and the surrounding vehicle 200 positioned close to the vehicle 100 is photographed in a lower region of the image information 42. Accordingly, by acquiring the reference feature amount 41 corresponding to the position of a partial region 61 in the an upper or a lower direction of a region indicated by the image information 42 by the feature acquisition unit 22, the reference feature amount 41 corresponding to the distance between the vehicle 100 and the surrounding vehicle 200 in the traveling direction can be acquired.

With this arrangement, similarity determination of a feature amount is made using a more appropriate reference feature amount 41. Therefore, the surrounding vehicle 200 can be detected from the image information 42 with high accuracy.

Fifth Variation Example

In the third embodiment, it has been considered whether the surrounding vehicle 200 travels in the same direction as the vehicle 100 or whether the surrounding vehicle 200 travels in the opposite direction to the vehicle 100. A description will be directed to a case where there is an intersection in front of a vehicle 100, as a fifth variation example.

Figure 30:
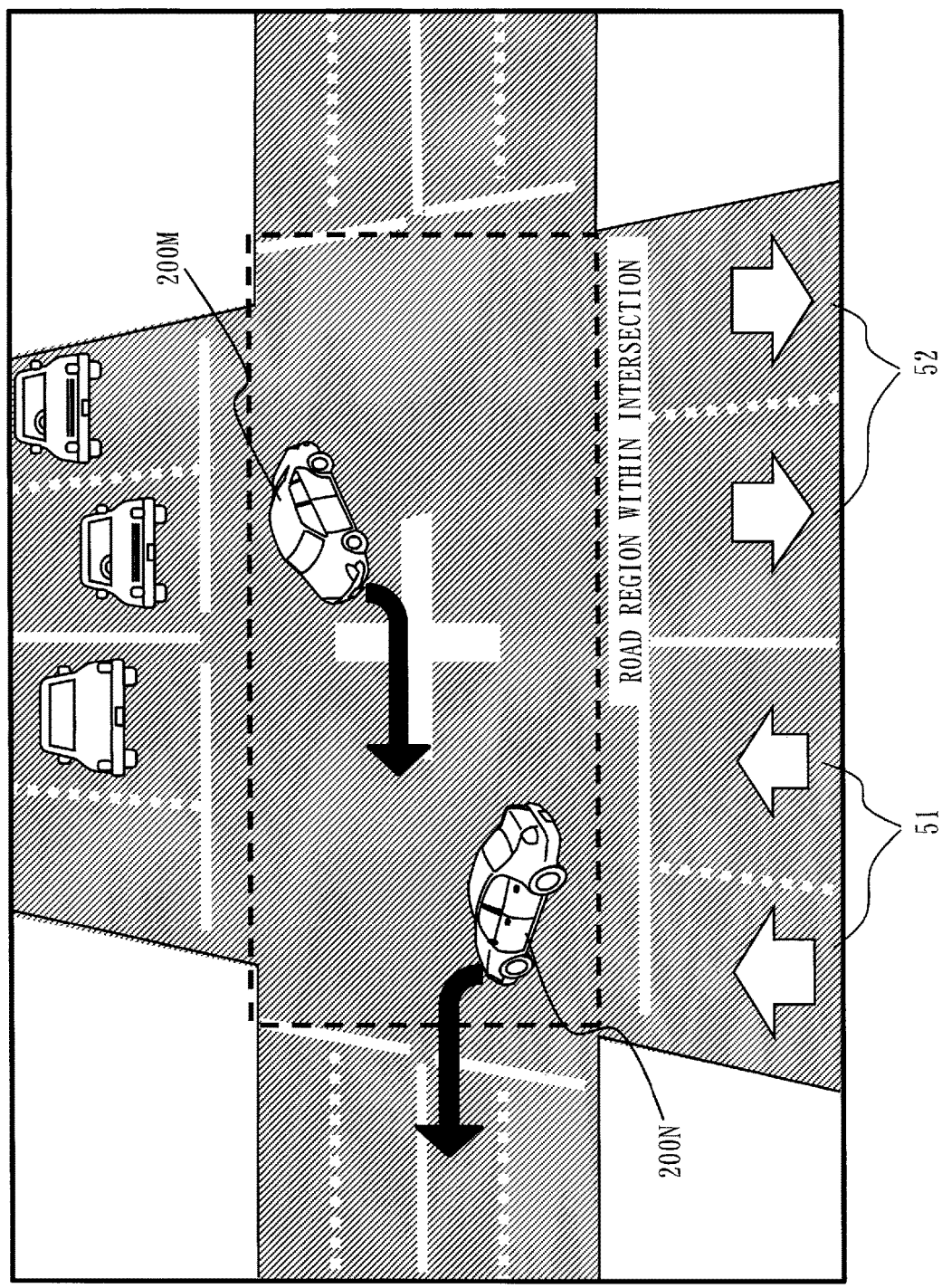
FIG. 30 is a diagram illustrating traveling states of surrounding vehicles 200 according to a fifth variation example.

As illustrated in FIG. 30, there may be surrounding vehicles 200 such as a surrounding vehicle 200M turning to the right and a surrounding vehicle 200N turning to the left, at the intersection. Each of the surrounding vehicle 200M turning to the right and the surrounding vehicle 200N turning to the left is directed in an oblique direction or in a lateral direction with respect to the vehicle 100.

Then, the vehicle 100 stores a reference feature amount 41 for the intersection in the storage 122. The reference feature amount 41 for the intersection is computed by using reference images obtained by photographing from right and left side portions of the vehicles and reference images obtained by photographing from right and left oblique front and rear portions of the vehicles. Then, in step S407 in FIG. 29, the lane identification unit 24 identifies the range of the intersection on the imaging plane of the camera 31, using the method described with reference to FIG. 24 and FIG. 25 in the third variation example, and identifies which lane's region and which intersection's region each partial region 61 includes. If it has been identified that the partial region 61 includes the intersection in step S407, the feature acquisition unit 22 acquires the reference feature amount 41 corresponding to the intersection, irrespective of the traveling direction of a surrounding vehicle 200.

With this arrangement, the surrounding vehicle 200 at the intersection can be detected at high speed and with high accuracy.

Fourth Embodiment

A fourth embodiment is different from the first to third embodiments in that similarity determination of a feature amount is made, using a reference feature amount 41 for a surrounding vehicle 200 that has been photographed with a part thereof hidden.

In the fourth embodiment, a description will be given about a case where a function is added to the third embodiment. The function may be, however, added to the first embodiment or the second embodiment.

Description of Configuration

Figure 31:
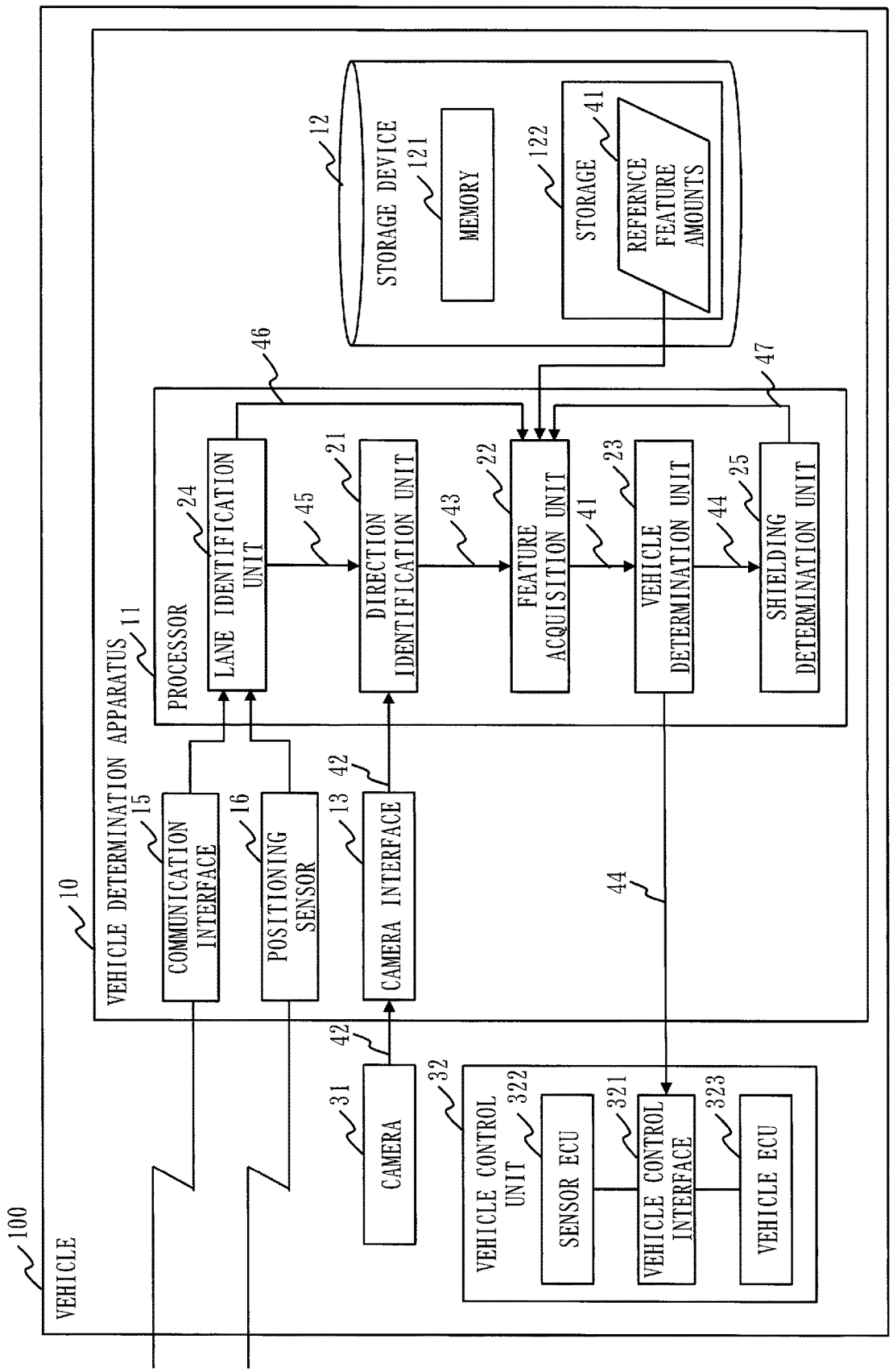
FIG. 31 is a configuration diagram of a vehicle determination apparatus 10 according to a fourth embodiment.

A configuration of a vehicle determination apparatus 10 according to the fourth embodiment will be described with reference to FIG. 31.

Figure 26:
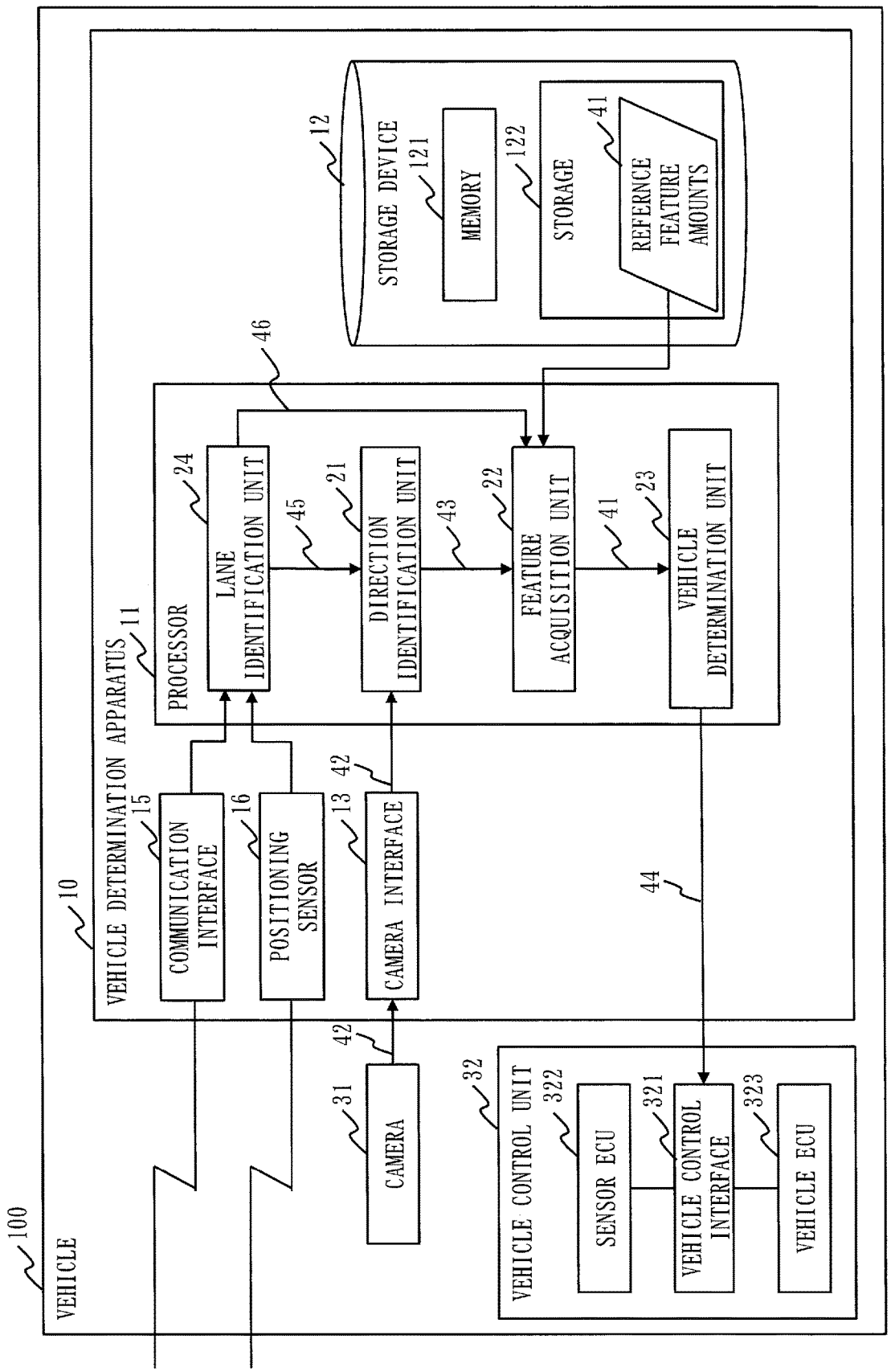
FIG. 26 is a configuration diagram of a vehicle determination apparatus 10 according to a third embodiment.

The vehicle determination apparatus 10 includes, in addition to the functional components of the vehicle determination apparatus 10 illustrated in FIG. 26, a shielding determination unit 25. A function of the shielding determination unit 25 is implemented by software, like the other functions of the vehicle determination apparatus 10.

Description of Operations

Operations of the vehicle determination apparatus 10 according to the fourth embodiment will be described, with reference to FIGS. 32 to 36.

The operations of the vehicle determination apparatus 10 according to the fourth embodiment correspond to a vehicle determination method according to the fourth embodiment. The operations of the vehicle determination apparatus 10 according to the fourth embodiment correspond to a vehicle determination program procedure according to the fourth embodiment.

Figure 32:
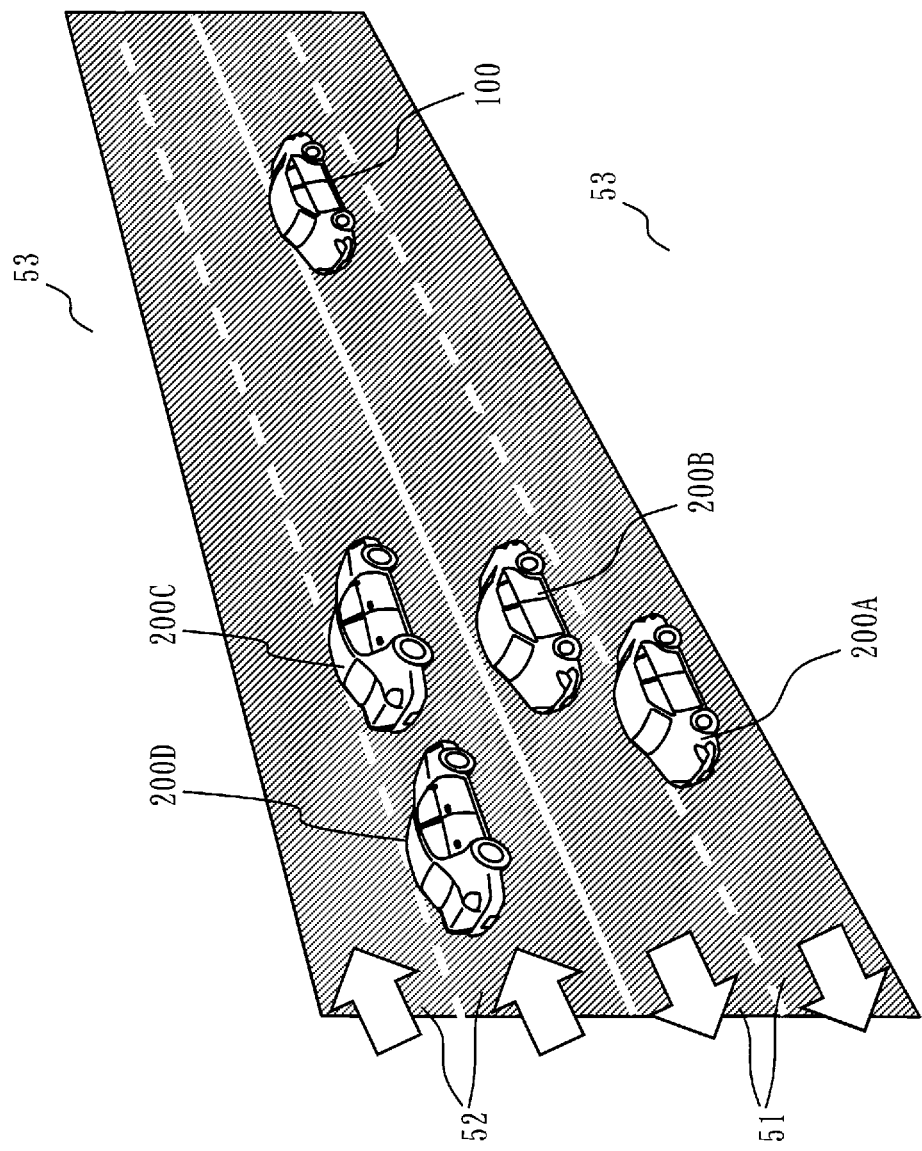
FIG. 32 is a diagram illustrating traveling states of surrounding vehicles 200 according to the fourth embodiment.
Figure 33:
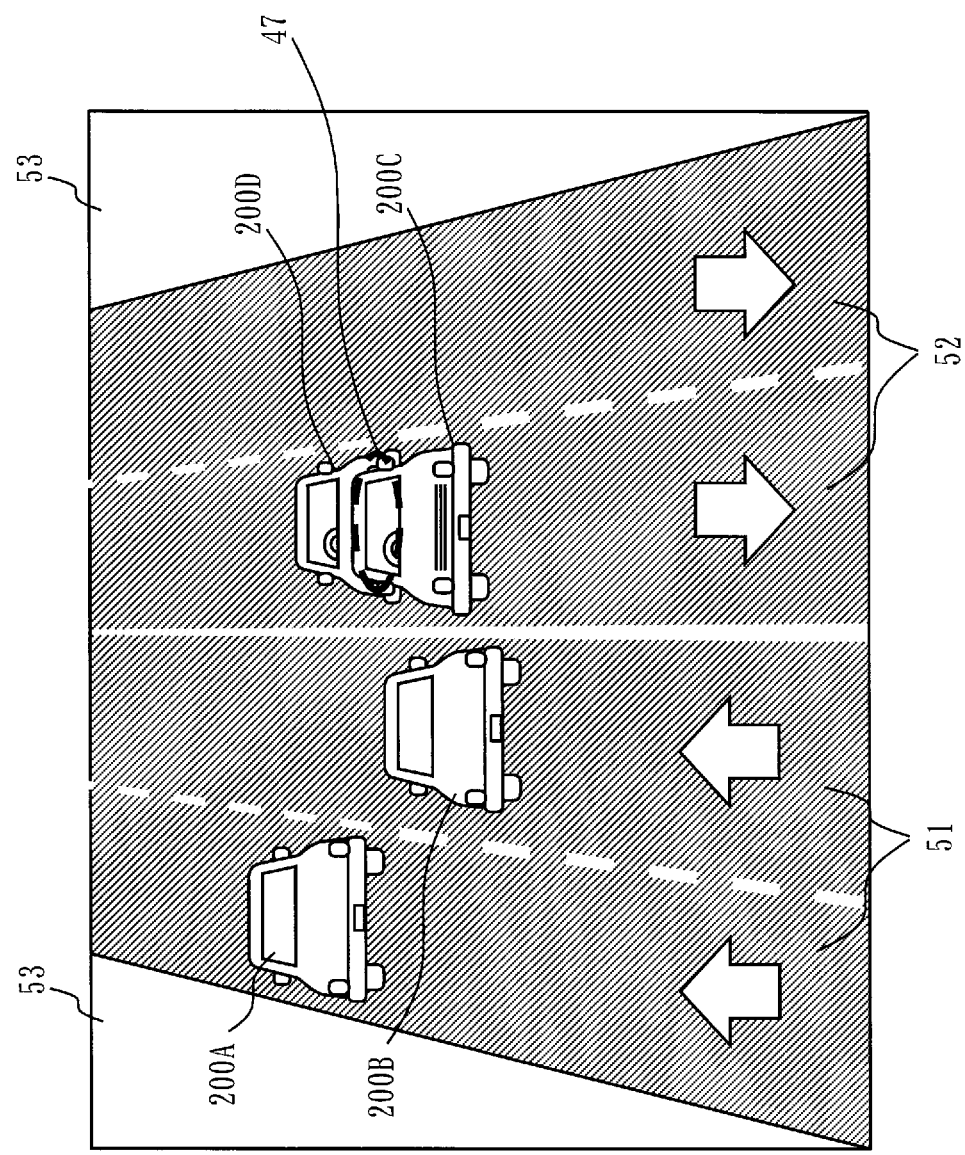
FIG. 33 is a diagram illustrating image information 42 that is obtained in a situation illustrated in FIG. 32 according to the fourth embodiment.

The operations of the vehicle determination apparatus 10 according to the fourth embodiment will be outlined with reference to FIGS. 32 and 33.

Referring to FIG. 32, a surrounding vehicle 200D travels just behind a surrounding vehicle 200C that travels in an opposite lane 52. When the front of a vehicle 100 is photographed by a camera 31 mounted on the vehicle 100 in a situation illustrated in FIG. 32, image information 42 as illustrated in FIG. 33 is obtained.

As illustrated in FIG. 33, the surrounding vehicle 200D that travels just behind the surrounding vehicle 200C is hidden by the surrounding vehicle 200C, so that only a part of the surrounding vehicle 200D is photographed. Then, the vehicle determination apparatus 10 stores a reference feature amount 41 for each presence or absence of a shielded region 47 that will be hidden by a different surrounding vehicle 200 or the like. Then, the vehicle determination apparatus 10 determines whether or not a surrounding vehicle 200 is present in a partial region 61 to be processed, using the reference feature amount 41 corresponding to the presence or absence of the shielded region 47.

Figure 34:
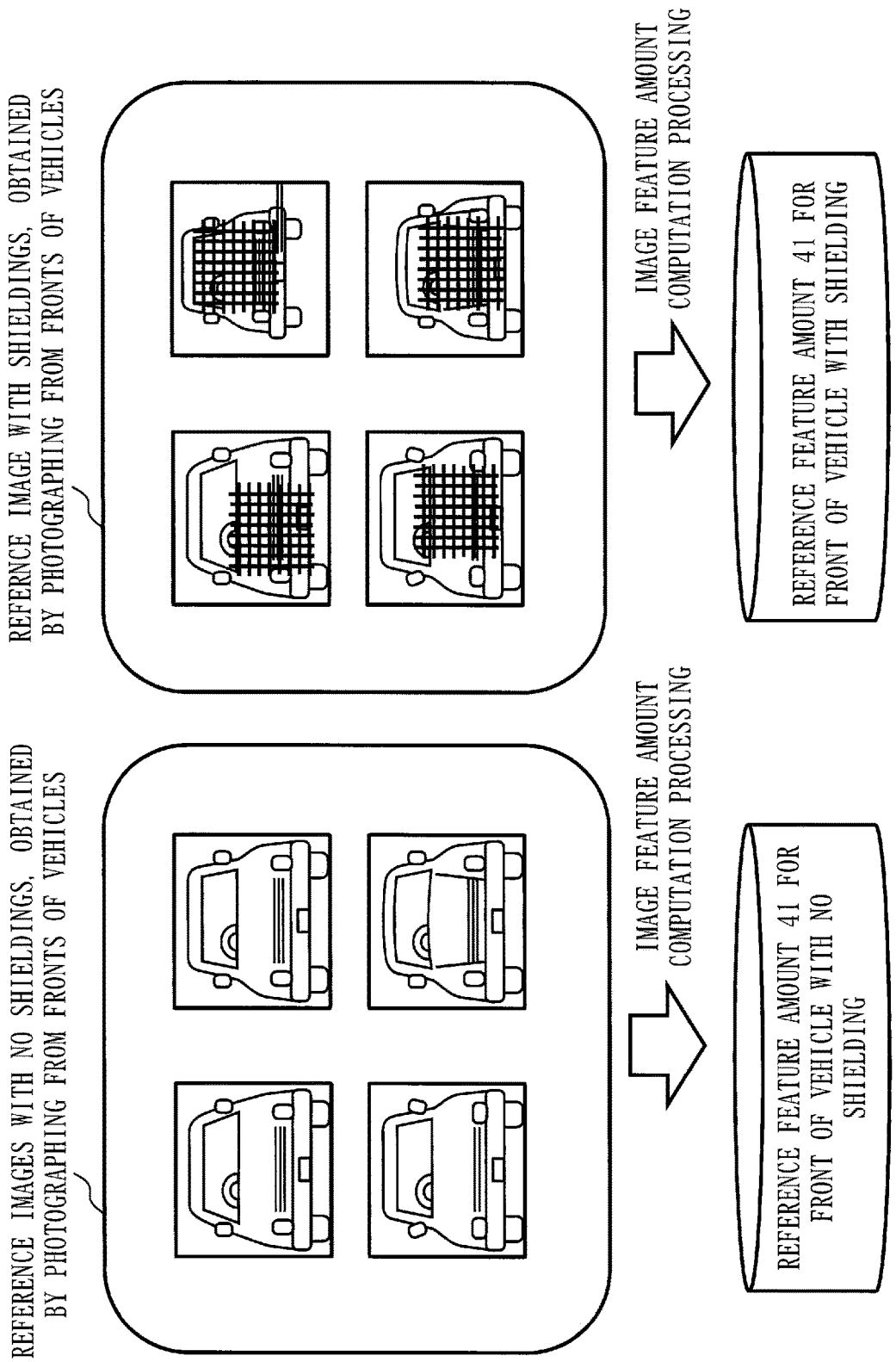
FIG. 34 includes explanatory diagrams of reference feature amounts 41 according to the fourth embodiment.

The reference feature amount 41 according to the fourth embodiment will be described with reference to FIGS. 34 and 35.

The reference feature amount 41 is computed, using reference images corresponding to a target photographing direction, the relative position of an associated lane with respect to a travel lane, and presence or absence of the shielded region 47. Referring to FIG. 35, the reference feature amounts 41 of 16 classes constituted from combinations of two photographing directions of the rear of a vehicle and the front of a vehicle and four relative positions of a same lane, a left-adjacent lane, a right-adjacent lane, and a second right-adjacent lane, and presence or absence of the shielded region 47 are computed. As illustrated in FIG. 34, the reference feature amount 41 in the case of absence of the shielded region 47 is computed from the reference images with no shielded regions 47, while the reference feature amount 41 in the case of presence of the shielded region 47 is computed from the reference images with the shielded regions 47.

The reference feature amount 41 corresponding to each class is stored in the storage 122, being associated with each class as illustrated in FIG. 35.

The operations of the vehicle determination apparatus 10 according to the fourth embodiment will be described in detail with reference to FIG. 36.

In the fourth embodiment, processes illustrated in FIG. 36 are repetitively executed for each certain period of time. The processes illustrated in FIG. 36 may be executed in accordance with occurrence of an event.

The processes from step S501 to step S507 are the same as the processes from step S401 to step S407 illustrated in FIG. 29. The processes from step S510 to step S513 are the same as the processes from step S409 to step S412 illustrated in FIG. 29.

In a shielding determination process in step S508, the shielding determination unit 25 determines whether or not a partial region 61 selected in step S505 includes a shielded region 47.

Figure 37:
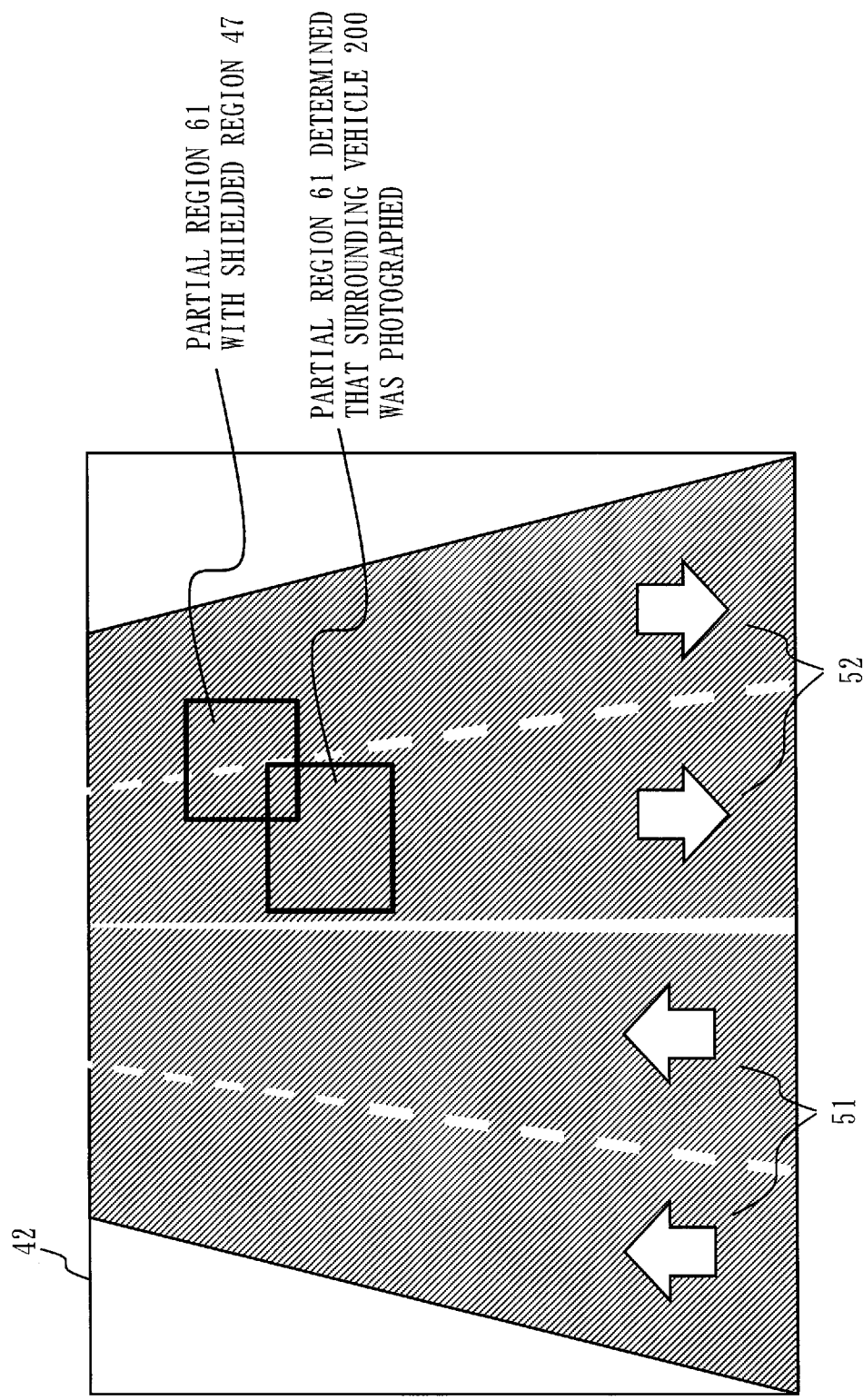
FIG. 37 is an explanatory diagram of a method of determining presence or absence of a shielded region 47 according to the fourth embodiment.

A specific description will be given with reference to FIG. 37. If the partial region 61 includes a different partial region 61 determined by the vehicle determination unit 23 that a surrounding vehicle 200 was photographed therein, it is highly likely that the partial region 61 includes the shielded region 47. Then, the shielding determination unit 25 reads, from the memory 121, identifying information 44 indicating the position of the surrounding vehicle 200 that was identified. Then, if the partial region 61 in image information 42 acquired in step S501 includes the different partial region 61 determined that the surrounding vehicle 200 was photographed therein, the shielding determination unit 25 determines that the partial region 61 includes the shielded region 47. On the other hand, if the partial region 61 does not include the different partial region 61 determined that the surrounding vehicle 200 was photographed therein, the shielding determination unit 25 determines that the partial region 61 does not include the shielded region 47. The shielding determination unit 25 writes a result of the determination into the memory 121.

In a feature amount acquisition process in step S509, the feature acquisition unit 22 acquires a reference feature amount 41 corresponding to the traveling direction of a surrounding vehicle 200 that has been identified in step S506, an associated lane that has been identified in step S507, and presence or absence of the shielded region 47 determined in step S508.

As a specific example, if the traveling direction of the surrounding vehicle 200 is the same direction as that a vehicle 100, the associated lane is the left-adjacent lane of a travel lane, and the shielded region 47 is present, the feature acquisition unit 22 acquires the reference feature amount 41 corresponding to the same direction as that of the vehicle 100, the left-adjacent line, and the presence of the shielded region 47. That is, the feature acquisition unit 22 reads, from the storage 122, a reference feature amount 41C2 in FIG. 35. Then, the feature acquisition unit 22 writes, into the memory 121, the reference feature amount 41 that has been read.

Effect of Fourth Embodiment

As mentioned above, the vehicle determination apparatus 10 according to the fourth embodiment determines whether or not the surrounding vehicle 200 is photographed in the partial region 61, using the reference feature amount 41 corresponding to whether or not the partial region 61 includes the shielded region 47. With this arrangement, the surrounding vehicle 200 can be detected from the image information 42 at high speed and with high accuracy.

Alternative Configuration

Sixth Variation Example

In each of the second to fourth embodiments, the function of each unit of the vehicle determination apparatus 10 has been implemented by the software, as in the first embodiment. The function of each unit of the vehicle determination apparatus 10, may be, however, implemented by the hardware, as in the first variation example. Further, as in the second variation example, a part of the functions of the vehicle determination apparatus 10 may be implemented by the hardware, and the other functions may be implemented by the software.

The above description has been given about the embodiments of the present invention. Some of these embodiments and the variation examples may be carried out in combination. Alternatively, any one or some of the embodiments and the variation examples may be partially carried out. The present invention is not limited to the embodiments and the variation examples described above, and various modifications are possible as necessary.

REFERENCE SIGNS LIST

10: vehicle determination apparatus; 11: processor; 12: storage device; 13: camera interface; 14: processing circuit; 15: communication interface; 16: positioning sensor; 21: direction identification unit; 22: feature acquisition unit; 23: vehicle determination unit; 24: lane identification unit; 25: shielding determination unit; 31: camera; 32: vehicle control unit; 321: vehicle control interface; 322: sensor ECU; 323: vehicle ECU; 41: reference feature amount; 42: image information; 43: direction information; 44: identifying information; 45: travel lane information; 46: associated lane information; 47: shielded region; 50: road; 51: parallel lane; 52: opposite lane; 53: road shoulder; 61: partial region; 62: cell; 100: vehicle; 200: surrounding vehicle

The invention claimed is:

1. A vehicle determination apparatus comprising:
processing circuitry to:
identify a traveling direction in which a surrounding vehicle travels in a partial region of a region indicated by image information obtained by photographing by a camera;
acquire a reference feature amount being a feature amount computed from a reference image corresponding to the identified traveling direction;
compute an image feature amount being a feature amount of the image information of the partial region and compare the computed image feature amount with the acquired reference feature amount, thereby determining whether or not the surrounding vehicle is present in the partial region; and
determine whether or not the partial region is a region including a shielded region overlapping with a different partial region in which a surrounding vehicle is determined to be present,
wherein the processing circuitry acquires the reference feature amount computed using a reference image depending on whether or not the partial region has been determined to be the region including the shielded region.

2. The vehicle determination apparatus according to claim 1,
wherein the processing circuitry identifies the traveling direction, based on a position of the partial region in the region indicated by the image information.

3. The vehicle determination apparatus according to claim 2,
wherein the processing circuitry identifies the traveling direction, based on a position of a partial region in which a surrounding vehicle was determined to be present in the past.

4. The vehicle determination apparatus according to claim 2,
wherein the processing circuitry identifies a travel lane in which a vehicle with the camera mounted thereon travels, and
identifies the traveling direction, based on the identified travel lane.

5. The vehicle determination apparatus according to claim 2,
wherein the processing circuitry identifies a region of a parallel lane with a same traveling direction as a traveling direction of a vehicle with the camera mounted thereon and a region of an opposite lane with a traveling direction opposite to the traveling direction of the vehicle with the camera mounted thereon, thereby identifying the traveling direction.

6. The vehicle determination apparatus according to claim 1,
wherein the processing circuitry identifies a travel lane in which a vehicle with the camera mounted thereon travels and an associated lane associated with the partial region, and acquires the reference feature amount computed from a reference image corresponding to a relative position of the associated lane with respect to the identified travel lane.

7. The vehicle determination apparatus according to claim 6,
wherein the processing circuitry acquires the reference feature amount computed from a reference image corresponding to a position of the partial region in an upper or a lower direction of the region indicated by the image information.

8. A vehicle determination method comprising:
identifying a traveling direction in which a surrounding vehicle travels in a partial region of a region indicated by image information obtained by photographing by a camera;
determining whether or not the partial region is a region including a shielded region overlapping with a different partial region in which a surrounding vehicle is determined to be present;
acquiring a reference feature amount being a feature amount computed from a reference image depending on the identified traveling direction and whether or not the partial region has been determined to be the region including the shielded region; and
computing an image feature amount being a feature amount of the image information of the partial region and comparing the computed image feature amount with the acquired reference feature amount, thereby determining whether or not the surrounding vehicle is present in the partial region.

9. A non-transitory computer readable medium storing a vehicle determination program to cause a computer to execute:
a direction identification process of identifying a traveling direction in which a surrounding vehicle travels in a partial region of a region indicated by image information obtained by photographing by a camera;
a feature amount acquisition process of acquiring a reference feature amount being a feature amount computed from a reference image corresponding to the traveling direction identified by the direction identification process;
a vehicle determination process of computing an image feature amount being a feature amount of the image information of the partial region and comparing the computed image feature amount with the reference feature amount acquired by the feature amount acquisition process, thereby determining whether or not the surrounding vehicle is present in the partial region; and
a shielding determination process of determining whether or not the partial region is a region including a shielded region overlapping with a different partial region determined by the vehicle determination process that a surrounding vehicle is present,
wherein the feature amount acquisition process acquires a reference feature amount computed from a reference image depending on whether or not the partial region has been determined to be the region including the shielded region by the shielding determination process.

* * * * *